United States Patent [19]
Rohrbaugh et al.

[11] Patent Number: 5,834,412
[45] Date of Patent: *Nov. 10, 1998

[54] SOIL RELEASE POLYMERS WITH FLUORESCENT WHITENING PROPERTIES

[75] Inventors: Robert Henry Rohrbaugh, Indian Springs; Eugene Paul Gosselink, Cincinnati, both of Ohio

[73] Assignee: The Procter & Gamble Company, Cincinnati, Ohio

[ * ] Notice: The term of this patent shall not extend beyond the expiration date of Pat. No. 5,728,671.

[21] Appl. No.: 868,785

[22] Filed: Jun. 4, 1997

Related U.S. Application Data

[63] Continuation-in-part of Ser. No. 576,243, Dec. 21, 1995, Pat. No. 5,728,671.

[51] Int. Cl.$^6$ .......................................................... C11D 3/37
[52] U.S. Cl. ........................ 510/324; 510/475; 510/528; 510/394; 8/647; 8/648; 528/288; 528/289; 528/290; 528/293; 528/298; 528/302; 528/308; 528/308.6
[58] Field of Search ...................................... 510/394, 475, 510/479, 528, 324; 8/647, 648; 528/288, 289, 290, 293, 302, 308, 308.6, 298

[56] References Cited

U.S. PATENT DOCUMENTS

| | | | |
|---|---|---|---|
| 3,962,152 | 6/1976 | Nicol et al. | 252/551 |
| 4,721,580 | 1/1988 | Gosselink | 252/90 |
| 4,877,896 | 10/1989 | Maldonado et al. | 560/14 |
| 4,968,451 | 11/1990 | Scheibel et al. | 252/549 |
| 5,039,782 | 8/1991 | Langer et al. | 528/272 |
| 5,041,230 | 8/1991 | Borcher, Sr. et al. | 252/8.9 |
| 5,082,578 | 1/1992 | Langer et al. | 252/8.7 |
| 5,164,100 | 11/1992 | Langer et al. | 252/8.6 |
| 5,182,043 | 1/1993 | Morrall et al. | 252/174 |
| 5,415,807 | 5/1995 | Gosselink et al. | 252/174.21 |
| 5,486,297 | 1/1996 | Marin-Carrillo et al. | 252/8.6 |
| 5,599,782 | 2/1997 | Pan et al. | 510/299 |

*Primary Examiner*—Paul Lieberman
*Assistant Examiner*—John R. Hardee
*Attorney, Agent, or Firm*—R. S. Echler, Sr.; B. M. Bolam; K. W. Zerby

[57] ABSTRACT

Oligomeric or polymeric substituted or unsubstituted ethylene terephthalate esters comprising fluorescent whitening groups useful as soil release agents in laundry detergent compositions are described. The soil release agents of the present invention are especially suitable for use with polyester and polyester-blended fabric.

13 Claims, No Drawings

SOIL RELEASE POLYMERS WITH FLUORESCENT WHITENING PROPERTIES

CROSS REFERENCE TO RELATED APPLICATIONS

This is a Continuation-In-Part Application of application Ser. No. 08/576,243 filed Dec. 21, 1995, now U.S. Pat. No. 5,728,671.

FIELD OF THE INVENTION

The present invention relates to substituted or unsubstituted terephthalate ester compounds having an oligomeric or polymeric backbone incorporating particular substituted or unsubstituted polyoxyethylene moieties and having at least one fluorescent whitening end capping or fluorescent whitening pendant group. The present invention also relates to laundry cleaning compositions comprising soil release polymers of the present invention.

BACKGROUND OF THE INVENTION

Products used in laundering operations contain a number of ingredients which provide certain basic benefits. For example, laundry cleaning products are formulated with detergent surfactant systems to remove a variety of soils from clothes during washing. These laundry products can also include ingredients which provide through-the-wash fabric conditioning benefits such as softening and anti-static performance. More typically, softening and anti-static benefits are provided by other fabric treatment products. These and other fabric products are added as part of the rinse cycle or else in the dryer to provide the conditioning benefit.

In addition to standard cleaning, softening and anti-static benefits, laundry detergent and fabric conditioning products can also impart other desirable properties. Of these, conferring desirable soil release and whitening properties to fabrics woven from polyester fiber, or in the case of whitening agents, also to natural fibers, have been the focus of research for many years. These target synthetic fabrics are mostly co-polymers of ethylene glycol and terephthalic acid, and are sold under a number of trade names, e.g. Cacron, Fortrel, Kodel and Blue C Polyester.

The hydrophobic character of polyester fabrics makes their laundering difficult, particularly as regards oily soil and oily stains. The oily soil or stain preferentially "wets" the fabric. As a result, the oily soil or stain is difficult to remove in an aqueous laundering process. To overcome this difficulty in removing such stains and soil, polyesters containing random ethylene terephthalate/polyethylene glycol (PEG) terephthalate units (e.g. MILASE T), have been used as soil release compounds in laundry detergent products. Although not straightforward, the development of improved soil release polymers having superior performance has produced agents that will efficiently absorb onto a given substrate e.g. fabric) from a variety of application matrices (e.g. laundry liquor). The ability to readily form a deposited layer upon a fabric surface and to remain affixed long after the application process has ended is a desirable quality of both soil release agents as well as other laundry additives, in particular fluorescent whitening agents.

The operation of brightening commercial fabrics is one of the highest value-added treatments of a laundry detergent aside from the primary role of soil removal from the fabric itself. With the aid of fluorescent whitening agents (FWA's), also referred to as optical brighteners, optical compensation of the yellow cast that develops on substrates such as fabric can be achieved. The yellow cast is produced by the absorption of short-wavelength light (violet-to-blue). With fluorescent whitening agents this lost light is in part replaced, thus a complete white is attained. This additional visible light is produced by the brightener by means of fluorescence. Optical whitening agents absorb the invisible ultraviolet portion of the daylight spectrum and convert this energy into the longer-wavelength visible position of the spectra. Fluorescent whitening, therefore, is based on the addition of light, whereas the older methods such as "blueing" is achieved by subtraction of light by the addition of blue or blue-violet dyes to textiles.

One problem encountered with common fluorescent whitening agents in laundry detergent applications is their lack of inherent affinity for hydrophobic fabric or soiled cotton. Typically comprised of small highly fluorescent molecules, optical brighteners are primarily modified to promote increased water solubility of the core organic structure. Because any molecular substituent added to these small, highly conjugated systems may upset the fluorescence emission profile, structural changes are made with due caution. In addition, highly planar molecules inherently clump, layer and stack instead of spreading out to form a uniform layer.

Surprisingly, the molecules of the present invention allow the formulator to address this problem of low fabric affinity. By combining fluorescent whitening agents into the structure of the soil release polymers, both the desirable properties of soil release activity and optical brightening can be introduced simultaneously.

It is well known to those skilled in the art that the properties which produce successful soil release agents (SRA's) are a delicate balance of several important properties. For example, the backbone of the SRA is key to providing affinity for the targeted fabric surface. When preparing molecules having soil release properties, a backbone that comprises many of the identical elements of the target fabric is not all that is necessary to produce a superior product. Manipulation of the polymer backbone structure as well as the end capping units has led to advances in soil release polymer technology. U.S. Pat. No. 3,962,152, Nicol, et alia, issued Jun. 8, 1976; U.S. Pat. No. 4,721,580, Gosselink issued Jan. 26, 1988 and U.S. Pat. No. 4,877,896, Maldonado, et alia, issued Oct. 31, 1989; U.S. Pat. No. 4,968,451, Scheibel, et alia, issued Nov. 6, 1990; U.S. Pat. No. 5,041,230; Borcher, Sr., et alia, issued Aug. 20, 1991; and U.S. Pat. No. 5,415,807; Gosselink, et alia, issued May 16, 1995; all incorporated herein by reference, describe soil release polymers having a wide range of utility and applications. Surprisingly, the present invention allows the formulator to combine fluorescent whitening agents with known soil release polymer technology, such as that described hereinabove, to obtain compounds that contain the desired properties of both molecules.

The choice of suitable end capping unit has been a matter of close technical scrutiny by those practicing the art of soil release polymer technology. The selection of proper end capping group lends important properties to the molecule, for example, physical state (solid or liquid), solubility properties, and compatibility with adjunct materials. Additionally, formulatability (liquid or granular), hot or cold water usage are just a few of the modes in which the SRA must have compatibility.

The present invention combines fluorescent whitening agents and soil release polymers in a manner that is very practical from a formulator's view point. The soil release agents are chosen for their desirable properties and then fluorescent whitening agents are attached to the molecular chain as end-capping units. The formulator may choose to terminate one or both ends of the molecule with a fluorescent end-capping unit. Alternatively, the polymer may comprise a pendant fluorescent whitening unit and have non-fluorescent whitening units as main polymer backbone end caps. In another embodiment, the formulator may have fluorescent units terminating only one or several branching chains. In addition, when the soil release polymer backbone is comprised of units that produce branching or "star" polymers, these additional "ends" may be capped with any proportion of fluorescent groups that is necessary to produce the desired properties of soil release and fluorescent whitening.

Because the fluorescent whitening units are attached as endcapping groups to the supporting SRA backbone their addition to the molecule is not accomplished in a hapless or "random" manner. Although many SRA's are assembled via "random polymerization", attachment of the fluorescent whitening agent is preferably accomplished in a controlled manner in order to assure the ability to balance the level of each functionality (SRA and FWA) in the molecule. Surprisingly, the present invention allows the formulator to incorporate along with the fluorescent whitening end-capping units, other suitable end-capping units (e.g. modified isethionate, sulfoaryl) that together provide for a complete delivery of both soil release and fluorescent whitening properties.

The prior art discloses certain hybrids of soil release polymers and fluorescent whitening agents, in particular U.S. Pat. No. 5,039,782, Langer, et alia, issued Aug. 13, 1991; U.S. Pat. No. 5,082,578, Langer, et alia, issued Jan. 21, 1992 and U.S. Pat. No. 5,164,100, Langer et alia, issued Nov. 17, 1992. These patent publications disclose soil release agents that comprise fluorescence whitening agents randomly incorporated directly into the main chain of the backbone portion of the respective molecules. The lack of control by which these agents are introduced into the framework of the molecule limits the utility of the method. Random incorporation of fluorescent whitening agents into SRA's may not be the most efficient method of delivery on a per weight basis. The random placement of FWA units may cause polymer backbone properties that are undesirable and also non-reproducible. Thirdly, FWA groups that are proximal to one another may have the opportunity to quench one another.

It is an object of the present invention to provide soil release properties and fluorescent whitening into the same molecules in a direct and controlled way.

It is an object of the present invention to provide soil release and fluorescent whitening properties into the same molecule in a manner that allows the formulator to chose a wide range of fluorescent whitening groups for use in the present invention.

It is a further object of the present invention to provide soil release polymers that have optionally one or more fluorescent whitening moieties incorporated into the molecule.

It is still further an object of the present invention to provide a laundry detergent composition comprising at least 0.01% of a detersive surfactant and at least 0.01% of a fluorescent whitening soil release polymer.

It is an object of the present invention to provide fluorescent whitening soil release polymers that can be formulated into either solid (bar), granular or liquid laundry detergent compositions.

SUMMARY OF THE INVENTION

The present invention relates to oligomeric or polymeric substituted or unsubstituted ethylene terephthalate ester compounds comprising fluorescent whitening groups, said compounds having the formula:

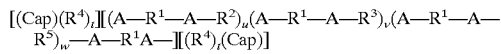

wherein the A moieties are selected from the group consisting of

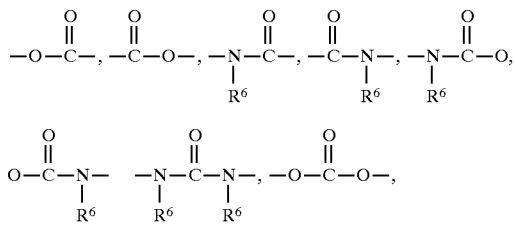

and combinations thereof, wherein $R^6$ is hydrogen, $C_1$–$C_4$ alkyl, and mixtures thereof; the $R^1$ moieties are 1,2-phenylene, 1,3-phenylene and 1,4-phenylene, substituted 1,2-phenylene, 1,3-phenylene, and 1,4-phenylene having the formula

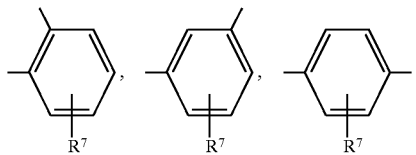

wherein $R^7$ is —OH, —$CO_2H$, —$SO_3^-M^+$, branching units of the formula —(A—$R^1$—A—$R^2$)$_u$(Cap), —(A—$R^1$—A—$R^2$)$_u$A(Cap), —(A—$R^1$—A—$R^3$)$_v$(Cap), —(A—$R^1$—A—$R^3$)$_v$A(Cap), —(A—$R^1$—A—$R^5$)$_w$(Cap), and —(A—$R^1$—A—$R^5$)$_w$A(Cap), crosslinking units of the formula —(A—$R^1$—A—$R^2$)$_u$—, —(A—$R^1$—A—$R^2$)$_u$A—, —(A—$R^1$—A—$R^3$)$_v$—, —(A—$R^1$—A—$R^3$)$_v$A—, —(A—$R^1$—A—$R^5$)$_w$—, and —(A—$R^1$—A—$R^5$)$_w$A— connecting said $R^1$ moiety to an $R^1$ or $R^5$ moiety of a second oligomer or polymer chain; substituted and unsubstituted naphthalene, arylalkylene units having the formula

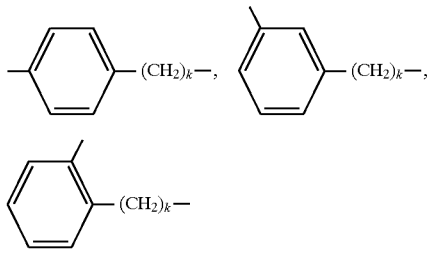

alkylene units having the formula

alkenylene units having the formula

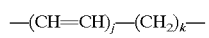

and combinations thereof, wherein k is 1 to 12, j is 1 or 2, and M is a cationic moiety; the $R^2$ moieties comprise substituted or unsubstituted ethyleneoxy units having the formula

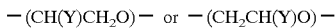

wherein (a) Y is a —H, $C_1$–$C_4$ alkyl, alkoxymethyl, and mixtures thereof, and (b) combinations of the foregoing $R^2$ moieties with up to 50% of other compatible $R^2$ moieties wherein Y is a branching unit of the formula —$CH_2O$—($CH_2CH_2O$)$_p$—$CH_2CH_2$—OR wherein R is $C_1$–$C_4$ alkyl or a crosslinking unit of the formula —$CH_2O$—($CH_2CH_2O$)$_p$—$CH_2CH_2$— by which said $R^2$ moiety is crosslinked to an $R^2$ moiety of a second oligomer or polymer chain; p is 0 to 50; the $R^3$ ethyleneoxy units are selected from the moieties —($CH_2CH_2O$)$_q$—$CH_2CH_2$— wherein q is from 1 to 99 wherein each $R^3$ unit may have the same or different values of q; the $R^4$ units are $R^2$, $R^3$ or $R^5$ units; the $R^5$ units having the formula

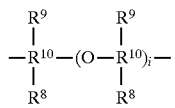

wherein the index i has the value of 0 or 1, $R^{10}$ is $C_2$–$C_6$ linear alkylene, $C_3$–$C_6$ branched alkylene, $C_5$–$C_7$ cyclic alkylene, $C_5$–$C_7$ substituted cyclic alkylene, $C_5$–$C_7$ heterocyclic alkylene, arylene, substituted arylene, and mixtures thereof; said $R^{10}$ unit is substituted by one or more $R^8$, $R^9$ unit, and mixtures thereof, wherein each $R^8$ is independently selected from the group consisting of hydrogen, $R^7$, and mixtures thereof; $R^9$ moieties wherein each $R^9$ is independently hydrogen, —Z—$SO_3^-M^+$, —Z—(FWU), and mixtures thereof, wherein each Z is a connecting moiety independently selected from the group consisting of alkylene, alkenylene, alkoxyalkylene, oxyalkylene, arylene, alkylarylene, alkoxyarylene, polyalkoxyalkylene units, and mixtures thereof, —(FWU) is a fluorescent whitening unit; wherein $R^8$ and $R^9$ when taken together, at least one $R^8$ or $R^9$ moiety is not a hydrogen atom; M is a cationic moiety; the value of t is 0 or 1; the value of u is from about 0 to about 60; the value of v is from about 0 to about 35; the value of w is from 0 to 35; comprising end-capping groups (Cap) independently selected from the group consisting of:
(a) fluorescent whitening units; and
(b) non-(fluorescent whitening) units, said non-(fluorescent whitening) units are selected from the group consisting of
  i) ethoxylated or propoxylated hydroxyethane and propanesulfonate units of the formula ($MO_3S$)($CH_2$)$_m$($R^{11}O$)$_n$$R^{11}$—, where M is a salt forming cation such as sodium or tetralkylammonium, $R^{11}$ is ethylene or propylene or a mixture thereof, m is 0 or 1, and n is from 0 to 20;
  ii) sulfoaroyl units of the formula —O(O)C($C_6H_4$)($SO_3^-M^+$), wherein M is a salt forming cation;
  iii) modified poly(oxyethylene)oxy monoalkyl ether units of the formula $R^{12}O(CH_2CH_2O)_kCH_2CH_2$—, wherein $R^{12}$ contains from 1 to 4 carbon atoms and k is from about 3 to about 100; and
  iv) ethoxylated or propoxylated phenolsulfonate end-capping units of the formula $MO_3S(C_6H_4)(OR^{13})_n$—, wherein n is from 1 to 20; M is a salt-forming cation; and $R^{13}$ is ethylene, propylene and mixtures thereof.

The compounds of the present invention are useful in articles which provide fabric soil release and fluorescent whitening benefits in certain laundry detergent compositions. These compositions comprise:

(a) at least 0.01% by weight, of a detersive surfactant;
(b) at least 0.01% by weight, a soil release polymer comprising a non-hydrolyzable fluorescent whitening end capping moiety; and
(c) carrier and adjunct ingredients.

All percentages, ratios and proportions herein are by weight, unless otherwise specified. All temperatures are in degrees Celsius (°C.). All documents cited are incorporated herein by reference.

DETAILED DESCRIPTION OF THE INVENTION

The soil release polymers of the present invention have the formula:

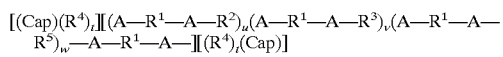

In this formula, the moiety

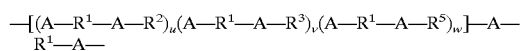

forms the oligomeric or polymeric backbone of the compound. The capping groups of the present invention are non-hydrolyzable fluorescent whitening or non-hydrolyzable non-fluorescent whitening end-capping units, (Cap). The capping groups of the present invention serve to cap or provide a distinct terminus to the ends of the main polymer chain (backbone) as well as serving to terminate any of the backbone branches. In addition to the role of truncating chain elongation, the non-hydrolyzable end-capping units provide specific properties to the soil release polymer.

The soil release polymers of the present invention comprise carbonyl linking A moieties, for example, carboxy linking A moieties having the structure

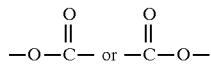

or amide linking A moieties having the structure

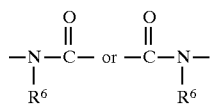

or carbamate linking A moieties having the structure

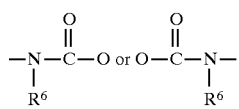

or urethane or carbonate linking A moieties having the formula

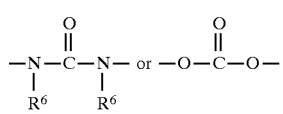

wherein $R^6$ is hydrogen, $C_1$–$C_4$ alkyl, and mixtures thereof. Preferably, linking moieties A consist entirely of (i.e., comprise 100%) carboxy moieties

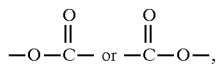

i.e., each A is either

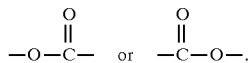

The degree of partial substitution in which carboxy moieties are replaced with these other linking moieties such as amide, urethane, carbamate and carbonate, should be such that the soil release properties of the compounds are not adversely affected to any great extent. In addition, the composition of A moieties must be consistent with proper chemical bonding, and where applicable, to fluorescent whitening end capping units, for example, peroxide linkages are not included.

The $R^1$ units are essentially phenylene, naphthalene, substituted phenylene and substituted naphthalene, as defined herein below, alkylarylene units of the formula

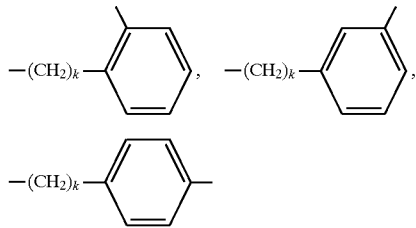

alkylene units having the formula

alkenylene moieties

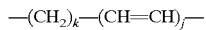

and combinations thereof with other possible $R^1$ groups, inter alia substituted 1,4-phenylene moieties; wherein k is 1 to 12, j is 1 or 2, M can be H or any compatible water-soluble cation. Suitable water-soluble cations include the water-soluble alkali metals such as potassium ($K^+$) and especially sodium ($Na^+$), as will as ammonium ($NH_4^+$). Also suitable are substituted ammonium cations having the formula:

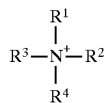

where $R^1$ and $R^2$ are each a $C_1$–$C_{20}$ hydrocarbyl group (e.g. alkylene, hydroxy-alkylene) or together form a cyclic or hererocyclic ring of from 4 to 6 carbon atoms (e.g. piperidine, morpholine); $R^3$ is a $C_1$–$C_{20}$ hydrocarbyl group; and $R^4$ is H (ammonium) or a $C_1$–$C_{20}$ hydrocarbyl group (quaternary amine). Typical substituted ammonium cationic groups are those where $R^4$ is H (ammonium) or $C_1$–$C_4$ alkyl, especially methyl (quaternary amine); $R^1$ is $C_{10}$–$C_{18}$ alkyl, especially $C_{12}$–$C_{14}$ alkyl; $R^2$ and $R^3$ are each $C_1$–$C_4$ alkyl, especially methyl.

For the purposes of the present invention substituted 1,2-phenylene, 1,3-phenylene, and 1,4-phenylene units are defined as moieties having essentially the formula:

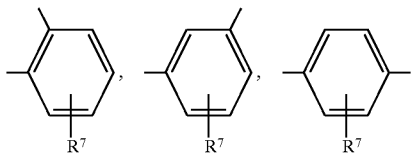

wherein one or more $R^7$ moiety, can be present on any one aromatic ring, said $R^7$ moiety comprises a single functional group, a branching chain or a crosslinking chain.

For the purposes of the present invention unsubstituted naphthalene moieties are defined as naphthalene units having no other substitutions other than the bonds linking these units to the polymer chain backbone. Examples of unsubstituted naphthalene suitable for the present invention include compounds having essentially the formula:

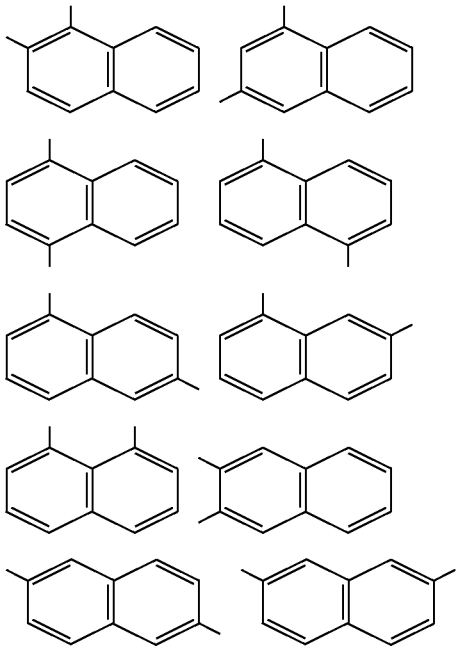

For the purposes of the present invention substituted naphthalene moieties are defined as naphthalene units having one or more substitutions. For example structures having the formula

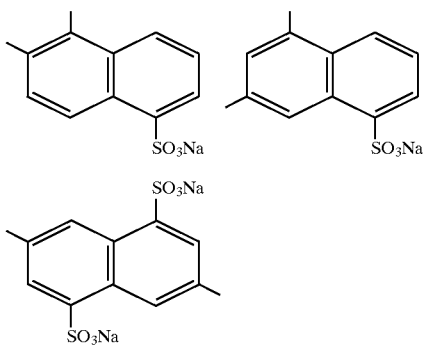

are examples of naphthalene units having one or more substitutions. The preferred naphthalene moieties of the present invention comprise naphthalene rings having a single substitution, for example, naphthalene rings incorporated into the main chain of the polymer backbone and having one additional moiety such as hydroxyl or —SO$_3^-$ M$^+$, or one branching chain or one crosslinking chain.

Preferably R$^1$ is 1,4-phenylene, 2,6-naphthalene, 1,5-naphthalene, substituted 1,3-phenylene, and substituted 2,6-naphthalene. More preferred R$^1$ are 1,4-phenylene and substituted 1,3-phenylene, most preferred is 1,4-phenylene. The R$^1$ moieties can be substituted with various moieties, for example R$^7$ is —OH, —CO$_2$H, —SO$_3^-$M$^+$, crosslinking units of the formula —(A—R$^1$—A—R$^2$)$_u$—, —(A—R$^1$—A—R$^2$)$_u$A—, —(A—R$^1$—A—R$^3$)$_v$—, —(A—R$^1$—A—R$^3$)$_v$A—, —(A—R$^1$—A—R$^5$)$_w$—, and —(A—R$^1$—A—R$^5$)$_w$A—.

For the purposes of the present invention branching units are defined as backbone-like chains comprising the units A, R$^1$, R$^2$, R$^3$, and R$^5$ whereby these branching units terminate in a suitable non-hydrolyzable fluorescent whitening end capping group or in a suitable non-hydrolyzable non-fluorescent whitening end capping group. For the purposes of the present invention the preferred branching units comprise the basic branching moieties having the formula —(A—R$^1$—A—R$^2$)$_u$(Cap), —(A—R$^1$—A—R$^2$)$_u$A(Cap), —(A—R$^1$—A—R$^3$)$_v$(Cap), —(A—R$^1$—A—R$^3$)$_v$A(Cap), —(A—R$^1$—A—R$^5$)$_w$(Cap), and —(A—R$^1$A—R$^5$)$_w$A(Cap) wherein the indices u, v and w indicate the number of non-end capping units present. For example, a branching moiety having the formula —(A—R$^1$—A—R$^2$)$_2$(Cap) wherein A is carboxy, R$^1$ is 1,4-phenylene and R$^2$ is ethyleneoxy, has the structure

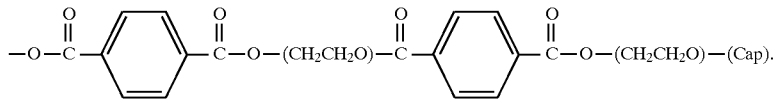

Typically the branching chains according to the present invention are comprised entirely of one type of basic branching unit and a suitable non-hydrolyzable capping moiety, for example, a branching chain having the structure —(A—R$^1$—A—R$^3$)$_x$(Cap), would only comprise —(A—R$^1$—A—R$^3$)— units, however, branching chains can also comprise a mixture of basic branching units, an example of which is a branching chain having the structure —(A—R$^1$—A—R$^5$)$_w$(A—R$^1$—A—R$^3$)$_x$(Cap). Mixed branching units of this type are more suitable for use in soil release polymers of the present invention having a "star" polymer branching. Star polymers are defined, for the purposes of the present invention, as soil release polymers according to the present invention that comprise moieties or other units in the polymer backbone that promote the formation of chain branching as well as soil release polymers that otherwise comprise multiple branching units.

The length of the branching unit when combined with the longest continuous portion of the polymer backbone may in some cases have a length that is equal to the length of the main continuous substituted or unsubstituted terephthalate polymer backbone but preferably the branching moiety is moderate in length, for example, the value of the indices u, v, and w of the branching unit are less than about 22, more preferably the branching moiety is short in length, the value of the indices u, v, and w are less than about 6. The branching units are terminated with a non-hydrolyzable end capping unit. The non-hydrolyzable end capping unit comprises either a non-fluorescent whitening end capping unit or a fluorescent whitening end-capping unit according to the present invention.

The substituted R$^1$ moieties additionally comprise R$^7$ substituents that are crosslinking moieties having the formula —(A—R$^1$—A—R$^2$)$_u$—, —(A—R$^1$—A—R$^2$)$_u$A—, —(A—R$^1$—A—R$^3$)$_v$—, —(A—R$^1$—A—R$^3$)$_v$A—, —(A—R$^1$—A—R$^5$)$_w$—, and —(A—R$^1$—A—R$^5$)$_w$A— that comprise the basic crosslinking units —(A—R$^1$—A—R$^2$)—, —(A—R$^1$—A—R$^2$)A—, —(A—R$^1$—A—R$^3$)—, —(A—R$^1$—A—R$^3$)A—, —(A—R$^1$—A—R$^5$)—, and —(A—R$^1$—A—R$^5$)A—. For the purposes of the present invention, a crosslinking moiety may comprise a mixture of units, for example, a —(A—R$^1$—A—R$^5$)— unit and a —(A—R$^1$—A—R$^2$)— may combine to form a mixed crosslinking moiety. This may result from pre-linking these two units or from the linking of a —(A—R$^1$—A—R$^5$)— extending from one chain which chemically combines with a —(A—R$^1$—A—R$^2$)— growing or extending from a second soil release polymer chain.

For the purpose of the present invention the term "crosslinking units" are defined as backbone-like chains comprising the units A, R$^1$, R$^2$, R$^3$, and R$^5$ and these crosslinking units thereby connect one polymer or oligomer chain of a soil release polymer with a second polymer or oligomer chain. Crosslinking units may connect similar moieties on two separate chains. For example an R$^1$ moiety of one chain may be connected by a crosslinking unit to an R$^1$ moiety of a second chain. Likewise, an R$^2$ moiety can be connected to an R$^2$ moiety of a second chain. However, crosslinking can occur between two separate moieties, for example, an R$^1$ unit of one chain can be crosslinked to an R$^2$, R$^3$ or R$^5$ unit of a second soil release polymer chain. For the purposes of the present invention the preferred crosslinking units are comprised of basic crosslinking moieties having the formula —(A—R$^1$—A—R$^2$)$_u$—, —(A—R$^1$—A—R$^2$—A)$_u$—, —(A—R$^1$—A—R$^3$)$_v$—, —(A—R$^1$—A—R$^3$)$_v$A—, —(A—R$^1$—A—R$^5$)$_w$—, and —(A—R$^1$—A—R$^5$)$_w$A— wherein the indices u, v and w can have the values from 1 to about 20, preferably from about 2 to about 6.

For the R$^1$ moieties, the degree of partial substitution with moieties other than 1,4-phenylene should be such that the soil release properties of the compound are not adversely affected to any great extent and that there is compatibility with the selected particular fluorescent whitening end capping unit. Generally the degree of partial substitution which can be tolerated will depend upon the backbone length of the compound, i.e., longer backbones can have greater partial substitution for 1,4-phenylene moieties. Usually compounds where the R$^1$ comprise from about 50 to 100% 1,4-phenylene moieties (from 0 to 50% moieties other than 1,4-phenylene) have adequate soil release activity and are compatible with any choice of one or more fluorescent whitening end capping units.

The R$^2$ moieties are essentially ethylene, —(CH$_2$CH$_2$O)$_p$—CH$_2$CH$_2$— or substituted ethylene moieties of the formula

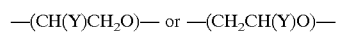

wherein the Y is C$_1$–C$_4$ alkyl, C$_1$–C$_4$ alkoxymethyl, —CH$_2$O—(CH$_2$CH$_2$O)$_p$—CH$_2$CH$_2$—OR wherein R is C$_1$–C$_4$ alkyl or a crosslinking unit of the formula, crosslinking units of the formula —(A—R$^1$—A—R$^2$)$_u$—, —(A—R$^1$—A—R$^2$)$_u$—A—, —(A—R$^1$—A—R$^3$)$_v$—, —(A—R$^1$—

A—R³)ᵥ—A—, —(A—R¹—A—R⁵)ᵥᵥ—, and —(A—R¹—A—R⁵)ᵥᵥ—A— which connect the R² moiety of one chain to an R¹, R² or R⁵ moiety of a second oligomer or polymer chain. As used herein, the term "the R² moieties are essentially substituted ethylene moieties having $C_1$–$C_4$ alkyl or alkoxymethyl substituents" refers to compounds of the present invention where the R² moieties consist entirely of substituted ethylene moieties, or are partially replaced with other compatible moieties having the aforementioned Y moieties. Examples of preferred compatible moieties include linear $C_2$–$C_6$ alkylene moieties such as ethylene, 1,3-propylene, 1,4-butylene, 1,5-pentylene or 1,6-hexylene, 1,2-cycloalkylene moieties such as 1,2-cyclohexylene, 1,4-cycloalkylene moieties such as 1,4-cyclohexylene and 1,4-dimethylenecyclo-hexylene, polyoxyalkylated 1,2-hydroxyalkylene such as

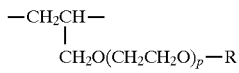

or alkyleneoxyalkyl moieties such as —$CH_2CH_2O$($CH_2CH_2$)—, wherein p is from 0 to 20.

For the R² moieties, the degree of partial replacement with these other compatible moieties should be such that the soil release, solubility and fluorescent whitening properties of the compounds are not adversely affected to any great extent. Generally, the degree of partial replacement which can be tolerated will depend upon the soil release, solubility and fluorescent whitening properties desired, the backbone length of the compound, (i.e., longer backbones generally can have greater partial replacement), and the type of moiety involved (e.g., greater partial substitutions with ethylene moieties generally decreases solubility). Usually, compounds where the R² comprise from about 20 to 100% substituted or unsubstituted ethylene moieties (from 0 to about 80% other compatible moieties) have adequate soil release activity. However, it is generally desirable to minimize such partial replacement for best soil release activity and solubility properties. (During the making of polyesters according to the present invention small amounts of polyoxyalkylene moieties (as dialkylene glycols) can be formed from glycols in side reactions and then incorporated into the polyesters). Preferably, R² comprises from about 80 to 100% substituted or unsubstituted ethylene moieties, and from 0 to about 20% other compatible moieties. For the R² moieties, more preferred substituted moieties include, 1,2-ethylene, 1,2-propylene, 1,2-butylene, 3-methoxy-1,2-propylene and mixtures thereof, most preferred R² substituted moieties are essentially 1,2-propylene moieties.

The R³ moieties are essentially the polyoxyethylene moiety —($CH_2CH_2O$)_q—$CH_2CH_2$— or polyalkylene moieties derived from block or random copolymerization of ethylene oxide with propylene oxide and/or butylene oxide. As used herein, the term "the R³ moieties are essentially the polyoxyethylene moiety —($CH_2CH_2O$)_q—$CH_2CH_2$—" refers to compounds of the present invention in which the R³ moieties consist entirely of this polyoxyethylene moiety, or further include other compatible moieties. The degree of inclusion of these other moieties should be such that the soil release properties of the compounds are not adversely affected to any great extent and that these moieties are compatible with the selected fluorescent whitening end capping moieties. Usually, in compounds of the present invention, the polyoxyethylene moiety comprises from about 50 to 100% of each R³ moiety. (During the making of polyesters according to the present invention, very small amounts of oxyalkylene moieties may be attached to the polyoxyethylene moiety in side reactions and thus incorporated into the R³ moieties).

For the polyoxyethylene moiety, the value for q is at least 1, and is preferably at least about 9, more preferably at least about 12. The value for q usually ranges from about 12 to about 50. Typically the value for q is in the range of from about 12 to about 35.

R⁴ moieties are an optional hydrolyzable fragment which serves to provide a suitable linking of the non-hydrolyzable end capping units to the oligomeric or polymeric backbone. R⁴ moieties comprise R², R³ or R⁵ units. Any R⁴ units may be used provided the rules of chemical bonding are adhered to and that no peroxide, —N—O— or azo bonds are formed.

The R⁵ units are essentially the substituted alkylene or alkylene ether moieties having the structure

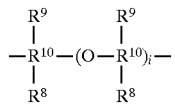

wherein the index i has the value of 0 or 1, and $R^{10}$ is $C_2$–$C_6$ linear alkylene, $C_3$–$C_6$ branched alkylene, $C_5$–$C_7$ cyclic alkylene, for example, of the formula;

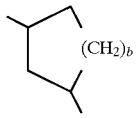

wherein the index b is from 1 to 3, however the attachment of the ring is not limited to 1,3 linkages as shown but may be 1,2 linkages or 1,4 linkages as well. $R^{10}$ is $C_5$–$C_7$ alkyl substituted cyclic alkylene wherein the alkyl substituents are $C_1$–$C_4$ alkyl; arylene, substituted arylene, $C_5$–$C_7$ heterocyclic alkylene, for example, piperidinyl, pyrrolinyl, 2,3-dioxanyl of the formula

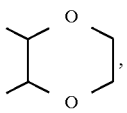

and 2,5-morpholinyl of the formula

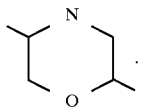

However any mono or di-heteroatomic ring comprising a nitrogen atom, oxygen atom, or mixtures thereof is suitable as an $R^{10}$ moiety except those units forming peroxide or azo bonds. The $R^{10}$ units are substituted by R⁸ and R⁹ units that independently selected, wherein R⁸ is hydrogen, R⁷, and mixtures thereof, R⁹ is hydrogen, —Z—$SO_3^-M^+$, or —Z—(FWU), wherein (FWU) is a fluorescent whitening unit as described hereinafter, Z is a side chain connecting moiety selected from the group consisting of alkylene, alkenylene, alkoxyalkylene, oxyalkylene, arylene, alkylarylene, alkoxyarylene, polyalkoxyalkylene, and mixtures thereof, M is a cationic moiety as defined further herein above.

Preferred R⁵ moieties are essentially $C_2$–$C_6$ alkylene chains substituted by one or more R⁸ and R⁹ moieties. The R⁵ units comprise either one $C_2$–$C_6$ alkylene chain substituted by one or more independently selected R⁸ and R⁹ moieties (preferred) or two $C_2$–$C_6$ alkylene chains said alkylene chains joined by an ether oxygen linkage, each alkylene chain substituted by one or more independently selected $R^8$ and $R^9$ moieties, that is $R^5$ may comprise two separate $R^{10}$ units, each of which is substituted by one or more independently selected $R^8$ and $R^9$ moieties. Preferably the $R^8$ units are hydrogen and preferably the $R^9$ units are —Z—$SO_3^-M^+$; more preferably all $R^8$ moieties are hydrogen and one $R^9$ moiety is —Z—$SO_3^-M^+$ with the remaining $R^9$ moieties being hydrogen atoms. When the value of the index i is equal to 1 (two $R^{10}$ units comprise the $R^5$ unit), a preferred formula is

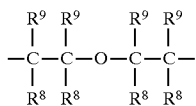

wherein each $R^{10}$ comprises a $C_2$ alkylene moiety. Preferably $R^8$ is hydrogen, one $R^9$ moiety is —Z—$SO_3^-M^+$, preferably the $C_2$ carbon is substituted by the —Z—$SO_3^-M^+$ moiety, and the balance are hydrogen atoms, having therefore a formula:

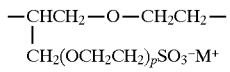

wherein Z is a polyethyleneoxymethyl moiety.

As used herein, the term "$R^5$ moieties consist essentially of units

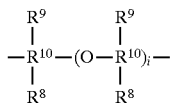

having the index i equal to 0 wherein $R^8$ units are hydrogen and having one $R^9$ equal to —Z—$SO_3^-M^+$ and having the remaining $R^9$ units equal to hydrogen, wherein Z is a side chain connecting moiety selected from the group consisting of alkylene, alkenylene, alkoxyalkylene, oxyalkylene, arylene, alkylarylene, alkoxyarylene and mixtures thereof", refers to the preferred compounds of the present invention wherein the $R^8$ moieties consist entirely of hydrogen atoms and $R^9$ moieties comprise for example a

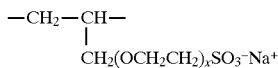

which is capable of inclusion into the polymeric backbone of the soil release polymers of the present invention as an —A—$R^5$—A— backbone segment. The units are easily incorporated into the oligomer or polymer backbone by combining starting materials having the general formula

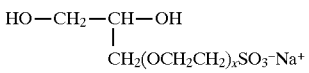

wherein x, for the purposes of the Z moiety of the present invention, is from 0 to 20.

Other suitable monomers capable of inclusion into the backbone of the soil release polymers of the present invention as $R^5$ moieties includes the alkoxyarylene-containing monomer having the general formula

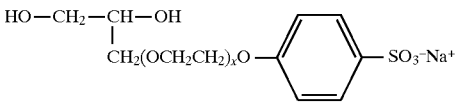

wherein x is 0 to 20. A further example of a preferred monomer resulting in a preferred $R^5$ unit wherein i is equal to 0, are the 2-sodiosulfopoly(ethyleneoxy)-methyl-1,2-propanediols having the formula

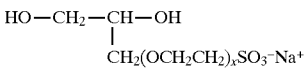

wherein x is from 0 to about 20; more preferred are the monomers

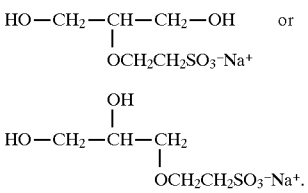

For the oligomer or polymer backbone of the soil release compounds of the present invention having the formula

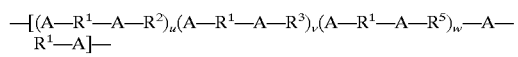

the indices u, v and w are defined as follows; the value of u is from about 0 to about 60; the value of v is from about 0 to about 35; the value of w is from 0 to 35.

END CAPPING UNITS

The compounds of the present invention further comprise non-hydrolyzable end capping units, (Cap). The end capping units are either fluorescent whitening units or non-fluorescent whitening units. One role of the end capping units of the present invention is to terminate the polymer backbone thereby ending chain propagation of the backbone and branching units. Also, the end capping units provide the soil release polymers of the present invention with certain intrinsic properties.

The formulator, by selection of the end capping units disclosed herein below, is able to design and prepare soil release polymers having a wide range of solubility and fabric affinity. In addition, the inclusion of the fluorescent whitening end-capping units provide to the consumer fabric optical brightening enhancement in a more efficient manner. The soil release polymers of the present invention have a high affinity for fabric. This high affinity assures the formulator can deliver the desired properties of soil release and fluorescent whitening in the most cost effective manner. The soil release polymers of the present invention can have an affinity for certain fabric surfaces as high as conventional optical brighteners but obtain this high affinity by different specificity. This low fabric affinity of traditional optical brighteners results in the fact that much of the fluorescent whitening agent formulated into laundry detergents is carried away in the laundry rinse liquor.

Fluorescent whitening units (FWU)

Fluorescent whitening units (FWU) can be capping groups or can be incorporated into $R^5$ units as pendant groups. The fluorescent whitening units can not be readily hydrolyzed into smaller sub-units or in the case where they comprise a pendant group with in $R^5$ units, they are not readily hydrolytically cleaved from the rest of the $R^5$ unit. Preferred non-hydrolyzable fluorescent whitening end-capping units of the present invention have the formula

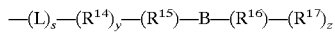

wherein the B units are conjugated bridging units, preferably ethylene units having the formula

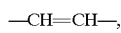

4,4'-bisphenylethylene units having the formula

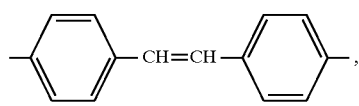

1,4-bisethylenephenylene units having the formula

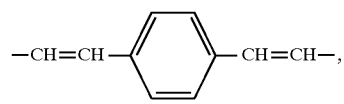

1,4-naphthylene, and mixtures thereof. More preferred B units are ethylene and 4,4'-bisphenylethylene, most preferred B unit is ethylene.

The $R^{14}$ units are 1,4-phenylene or substituted 1,4-phenylene moieties of the formula

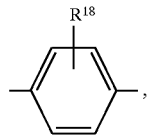

or triazinylamino or substituted triazinylamino units of the formula

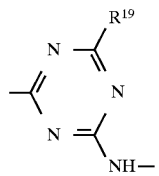

wherein $R^{18}$ and $R^{19}$ are independently selected from the group consisting of hydroxyl, amino, cyano, halogen, $-SO_3^-M^+$, $C_1-C_4$ alkylamino, $C_1-C_4$ dialkylamino and mixtures thereof. Preferred $R^{14}$ units are unsubstituted 1,4-phenylene and substituted 1,4-phenylene, more preferred is unsubstituted 1,4-phenylene. The index y has the value 0 or 1. When the index y is 0, the non-hydrolyzable fluorescent end-capping unit, (Cap), segments L and $R^{15}$ are bonded directly to one another. When the index y is 1, and $R^{14}$ is a substituted 1,4-phenylene, preferred $R^{18}$ moieties are cyano and $-SO_3^-M^+$, preferably $-SO_3^-M^+$. When $R^{14}$ is a substituted triazinylamino moiety the preferred $R^{19}$ are amino, $C_1-C_4$ alkylamino, $C_1-C_4$ dialkylamino and mixtures thereof, more preferred are $C_1-C_4$ alkylamino or $C_1-C_4$ dialkylamino, most preferred are dimethylamino, methylamino, diethylamino and ethylamino.

The $R^{15}$ and $R^{16}$ units are each independently 1,4 phenylene moieties or substituted 1,4-phenylene moieties of the formula

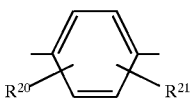

wherein the $R^{20}$ and $R^{21}$ moieties are each independently selected for the $R^{15}$ and $R^{16}$ units. $R^{20}$ and $R^{21}$ moieties are selected from the group consisting of hydrogen, $C_1-C_4$ alkyl, amino, $C_1-C_4$ alkylamino, $C_1-C_4$ dialkylamino, $C_1-C_4$ alkoxy, anilino, N-methyl-N-bydroxyethylamino, bis (hydroxyethyl)amino, morpholino, diethylamino, chloro, bromo, iodo, cyano, nitrilo, sulfophenylamino, 2,5-disulfophenylamino, $-(SO_3^-M^+)$, $-CO_2H$, and mixtures thereof. The preferred embodiments of the non-hydrolyzable fluorescent end-capping units of the present invention have $R^{15}$ and $R^{16}$ units that comprise only one substituent, that is only the $R^{20}$ unit is present in the preferred embodiments ($R^{21}$ is hydrogen). When the $R^{20}$ and $R^{21}$ units are both present, the groups are preferably oriented para or meta relative to one another on the 1,4-phenylene ring, more preferably $R^{20}$ and $R^{21}$ are oriented para to one another.

Preferred $R^{20}$ and $R^{21}$ units are amino, $C_1-C_4$ alkylamino, $C_1-C_4$ dialkylamino, $C_1-C_4$ alkoxy, anilino, N-methyl-N-hydroxyethylamino, bis(hydroxyethyl)amino, morpholino, diethylamino, sulfophenylamino, 2,5-disulfophenylamino, and $-(SO_3^-M^+)$, more preferred are $C_1-C_4$ alkylamino, $C_1-C_4$ dialkylamino, N-methyl-N-hydroxyethylamino, bis (hydroxyethyl)amino, and $-(SO_3^-M^+)$, most preferred is $-(SO_3^-M^+)$. Most preferred $R^{21}$ unit is hydrogen, that is, $R^{15}$ and $R^{16}$ have only one substituent group present.

The $R^{17}$ units are selected from the group consisting of hydrogen, hydroxyl, amino, methylamino, dimethylamino, cyano, $-SO_3^-M^+$, $C_1-C_4$ alkyl, $C_1-C_4$ alkoxy, phenyl, substituted phenyl of the formula

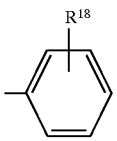

wherein $R^{18}$ is selected from the group consisting of hydrogen, hydroxyl, amino, cyano, halogen, $-SO_3^-M^+$, $C_1-C_4$ alkylamino, $C_1-C_4$ dialkylamino and mixtures thereof; triazinylamino, or a substituted triazinylamino or substituted aniline of the formulas

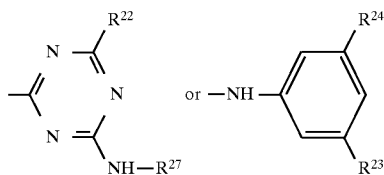

wherein $R^{22}$, $R^{23}$, $R^{24}$ and $R^{27}$ are independently selected from the group consisting of hydrogen, hydroxyl, amino, cyano, halogen, $-SO_3^-M^+$, $C_1-C_4$ alkylamino, $C_1-C_4$ dialkylamino and mixtures thereof. The index z has the value 0 or 1. When the index z is 0, the (Cap) terminates in $R^{16}$ units. When the index z is 1, and $R^{17}$ is a substituted 1,4-phenylene, preferred $R^{18}$ moieties are amino and $-SO_3^-M^+$, preferably $-SO_3^-M^+$. When $R^{17}$ is substituted triazinylamino, preferred $R^{22}$ is amino, $C_1-C_4$ alkylamino, $C_1-C_4$ dialkylamino and mixtures thereof, more preferred is $C_1-C_4$ alkylamino or $C_1-C_4$ dialkylamino, most preferred is dimethylamino, methyl-amino, diethylamino and ethylamino. When $R^{17}$ is substituted triazinylamino preferred $R^{27}$ is $C_1-C_4$ alkyl, most preferred is methyl and ethyl. When $R^{17}$ is a substituted aniline preferred $R^{23}$ and $R^{24}$ are amino, $C_1-C_4$ alkylamino, $C_1-C_4$ dialkylamino and mixtures thereof, more preferred is $C_1-C_4$ alkylamino or $C_1-C_4$ dialkylamino, most preferred is dimethylamino, methylamino, diethylamino and ethylamino.

Preferred $R^{18}$ units are unsubstituted amino, methylamino, dimethylamino, cyano, $-SO_3^-M^+$, $C_1-C_4$ alkyl, $C_1-C_4$ alkoxy, 1,4-phenylene, substituted 1,4-phenylene, more preferred are dimethylamino, methylamino, diethylamino, ethylamino, $-SO_3^-M^+$ and unsubstituted 1,4-phenylene. Most preferred $R^{18}$ are dimethylamino, diethylamino and $-SO_3^-M^+$.

For the purpose of the present invention, when $R^{17}$ is a hydrogen atom, the value of the index z is 1.

The linking L units of the non-hydrolyzable end-capping units of the present invention serve to attach the fluorescent portion of the end capping unit to the polymer backbone.

The L units are selected from the group consisting of A units, $R^2$ units, $R^3$ units, $R^5$ units, oxygen, $C_1-C_4$ alkyl, $C_1-C_4$ alkoxy, alkylamino, alkoxyamino, alkyldiamino, and mixtures thereof. Preferred linking units are A units, oxygen, and $C_1-C_4$ alkyleneoxy. L linking groups are selected in such a way that no non-compatible chemical bonding is present. For example, provided that when L=A, the A unit is not readily hydrolytically cleaved from the rest of the end capping unit. That is, the linkage subject to hydrolysis is between the linking group A and the polymer backbone, not between linking group A and the rest of the capping group. For the purpose of the present invention "non-hydrolytically cleaved" refers to "hydrolysis or alcoholysis under acid or base catalyzed conditions, especially under the normal conditions of processing or usage by consumers".

An example of an (Cap) moiety attached to a soil release polymer backbone has the structure:

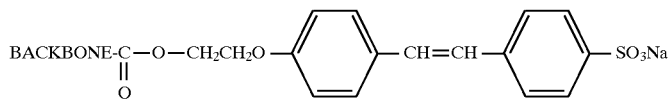

and when this BACKBONE-(Cap) is subjected to the proper hydrolysis conditions, the unit above fragments into the -(Cap) and BACKBONE- units having the structure

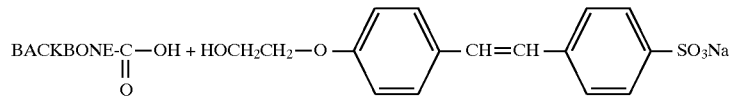

In the above cited example, BACKBONE—$CO_2H$ represents the hydrolyzed soil release polymer backbone. The end capping group comprises linking L unit that is an ethyleneoxy group, $-CH_2CH_2O-$, $R^{14}$ unit is absent (y is equal to 0), $R^{15}$ unit is 1,4-phenylene, bridging unit B is ethylene, $R^{16}$ is 1,4-phenylene and $R^{17}$ is $-SO_3^-M^+$ wherein M is sodium.

Another example of a non-hydrolyzable end-capping unit, wherein the linking L unit is an A unit (A unit stays with the fluorescent end capping group and is part of the non-hydrolyzable end cap); $R^{14}$ unit is absent (y is equal to 0), $R^{15}$ unit is 1,4-phenylene, bridging unit B is ethylene, $R^{16}$ is 1,4-phenylene and $R^{17}$ is $-SO_3^-M^+$ wherein M is sodium has the formula:

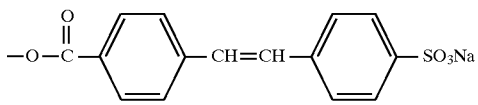

Further suitable non-hydrolyzable end-capping units of the present invention have the formula

—L—FWA—R$^{25}$ wherein linking unit L is the same as defined herein above, FWA is a fluorescent whitening unit non-limiting examples of which include substituted and unsubstituted stilbenes, coumarins, pyrazoles, naphthalimides, oxadizoles, aryl triazoles, distyrylbiphenyls, dibenzofuranyl biphenyls, bis(triazinyl)stilbenes, mono(triazinyl)stilbenes, stilbenylnaphthotriazoles, phenylstilbenylbenzoxazoles, bis(triazoyl)stilbenes, 1,4-bis(styryl)benzenes, 4,4'-bis(styryl)benzenes, 1,3-diphenyl-2-pyrazolines, bis(benzazoyl) derivatives, bis(benzimidizolyl) derivatives, 2-(benzofuranyl)benzimidazoles, coumarins, carbostyrils, and mixtures thereof; R$^{25}$ is a substituent group that modifies the optical or solubility properties or the FWA unit.

Examples of non-hydrolyzable end-capping units of the present invention comprising FWA units are naphthotriazole units having the formula

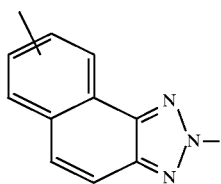

wherein the R$^{25}$ moiety and the linking L unit are attached to the same aromatic ring, for example

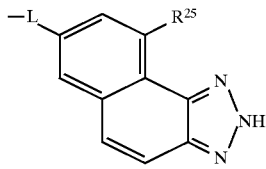

or in any other chemically suitable manner.

The FWA units are phenyltriazole units having the formula

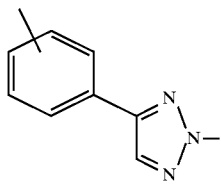

wherein the R$^{25}$ moiety and the linking L unit are attached to the same aromatic ring, for example

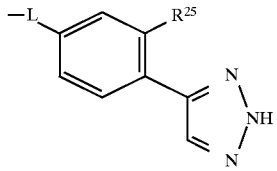

or in any other chemically suitable manner. The FWA units are substituted or unsubstituted conjugated heterocycles having the formula

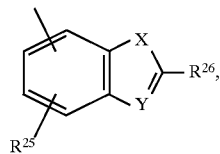

wherein R$^{25}$ is C$_1$–C$_4$ alkyl, —CO$_2$M, —SO$_3$M, wherein M is hydrogen or a water soluble cation; R$^{26}$ is hydrogen or C$_1$–C$_4$ alkyl; X is oxygen, —NH—, —CH$_2$—, and mixtures thereof; Y is —N—, —CH—, and mixtures thereof.

Fused ring FWA units also have the formula

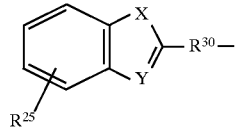

wherein R$^{25}$ is C$_1$–C$_4$ alkyl, —SO$_3$M, wherein M is hydrogen or a water soluble cation; R$^{30}$ is a B unit as described herein above, 1,2-phenylene, 1,3-phenylene, 1,4-phenylene, substituted phenylene having the formula:

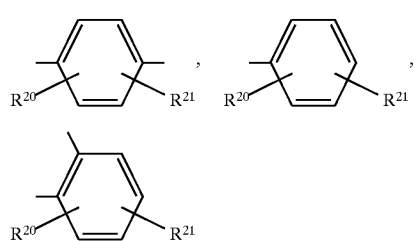

wherein R$^{20}$ and R$^{21}$ moieties are selected from the group consisting of hydrogen, C$_1$–C$_4$ alkyl, C$_1$–C$_4$ dialkylamino, C$_1$–C$_4$ alkoxy, anilino, morpholino, diethylamino, chloro, bromo, iodo, cyano, nitrilo, sulfophenylamino, 2,5-disulfophenylamino, —(SO$_3^-$M$^+$), and mixtures thereof, preferably R$^{20}$ and R$^{21}$ units are hydrogen, C$_1$–C$_4$ dialkylamino, C$_1$–C$_4$ alkoxy, anilino, morpholino, diethylamino, sulfophenylamino, 2,5-disulfophenylamino, and —(SO$_3^-$M$^+$), more preferred are hydrogen, C$_1$–C$_4$ dialkylamino, N-methyl-N-hydroxyethylamino, bis(hydroxyethyl)amino, and —(SO$_3^-$M$^+$), most preferred are hydrogen and —(SO$_3^-$M$^+$). Most preferred R$^{21}$ unit is hydrogen, that is, R$^{30}$ has only one substituent group present. R$^{30}$ is carboxyphenylene having the formula:

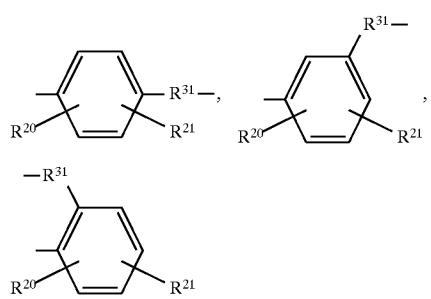

wherein R$^{31}$ is —CO$_2$—, —CONH—, —NHCO—, and mixtures thereof; X is oxygen, —NH—, —CH$_2$—, —CHR$^{28}$— wherein R$^{28}$ is C$_1$–C$_4$ alkyl; and mixtures thereof; Y is —N=, —CH=, —CR$^{29}$= wherein R$^{29}$ is C$_1$–C$_4$ alkyl; and mixtures thereof. The R$^{30}$ unit can be bonded to the soil release polymer backbone either directly or through a linking group L. The same applies when $R^{30}$ comprises a carboxy moiety $R^{31}$, the $R^{31}$ units can be bonded either directly to the polymer backbone or through a linking group. The conjugated heterocycle FWA's are preferably attached to linking L units in a manner similar to the naphthalotriazole and phenyltriazole moieties The following is an example of a benzofuranyl FWA unit according to the present invention having the formula:

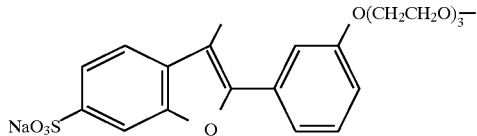

wherein $R^{25}$ is —$SO_3Na$, X is oxygen, Y is —$C(CH_3)$=, $R^{30}$ is 1,3-phenylene, and the FWA is bonded to a linking group L which comprises an oxyethyleneoxy unit having three ethyleneoxy units.

A preferred example of a non-hydrolyzable fluorescent end capping unit of the present invention having a linking L unit that is an ethylene moiety, $R^{14}$ is a substituted triazinyl moiety wherein $R^{19}$ is bis(hydroxyethyl)amino; $R^{15}$ is substituted 1,4-phenylene wherein $R^{20}$ is —$SO_3Na$, and $R^{21}$ is hydrogen atom; bridging B unit is ethylene; $R^{16}$ is substituted 1,4-phenylene wherein $R^{20}$ is —$SO_3Na$, and $R^{21}$ is hydrogen atom; $R^{17}$ is substituted triazinyl wherein $R^{24}$ is hydrogen atom, $R^{27}$ is methyl has the formula:

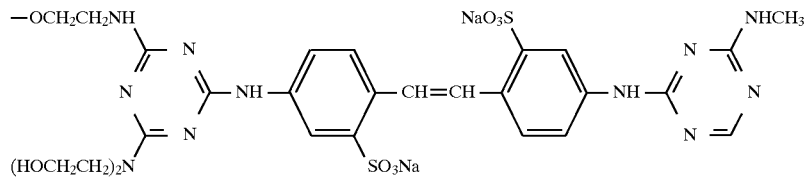

A preferred example of a non-hydrolyzable fluorescent end capping unit of the present invention wherein $R^{14}$ comprises a substituted benzofuranyl moiety; $R^{25}$ is —$SO_3Na$, $R^{30}$ is 4-carboxyphenylene, X is oxygen, Y is —$CR^{29}$= wherein $R^{29}$ is methyl, has the formula:

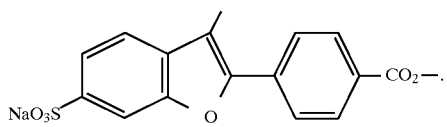

Pendant Fluorescent Whitening Units

The fluorescent whitening units of the present invention may also be present as pendant groups on $R^5$ units to form a "Pendant Fluorescent Whitening Unit". For the purposes of the present invention a "Pendant Fluorescent Whitening Unit" is defined as a fluorescent whitening unit that is suitably attached as a pendant group within a $R^5$ unit.

For example an $R^5$ moiety having the formula

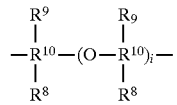

wherein the index i is equal to 0 or 1, $R^{10}$ is $C_2$–$C_6$ linear alkylene, $C_3$–$C_6$ branched alkylene, $C_5$–$C_7$ cyclic alkylene, $C_5$–$C_7$ substituted cyclic alkylene, $C_5$–$C_7$ heterocyclic alkylene, arylene, substituted arylene, and mixtures thereof. An example of an $R^5$ moiety comprising a fluorescent whitening unit (FWU) as a pendant group wherein $R^{10}$ unit is a branched $C_3$ alkylene moiety having all $R^8$ units comprise hydrogen atoms, $R^9$ units comprise hydrogen atoms a single —Z— (FWU) unit, herein after referred to as "$R^5$ unit comprising a single —Z—(FWU) pendant group" has the formula

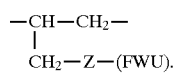

Substituting for the general —(FWU) moiety, Z is oxygen atom, $R^{14}$ unit is absent (y is equal to 0), $R^{15}$ unit is 1,4-phenylene, bridging unit B is ethylene, $R^{16}$ is 1,2-phenylene and $R^{17}$ is —$SO_3^-M^+$ wherein M is sodium has the formula:

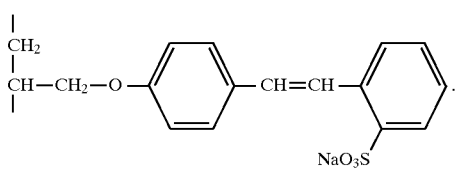

The above adduct is an example of a minimal chain length $R^5$ unit comprising a non-hydrolyzable pendant fluorescent whitening unit. This unit can be incorporated into the soil release polymer chain through an intermediate having the formula

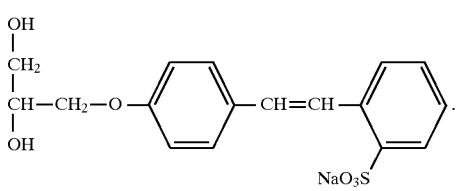

A example of a monomer suitable for use as an $R^5$ moiety comprising a fluorescent whitening group which thereby forms a "pendant fluorescent whitening group" has the structure

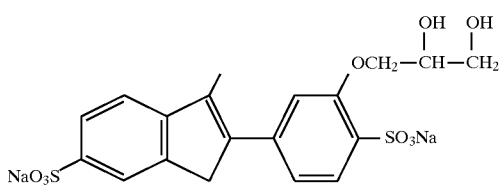

wherein the $R^5$ unit is a single chemical unit and the fluorescent whitening group is non-hydrolyzable from the backbone of the soil release polymer after incorporation.

A further example of an $R^5$ moiety comprising a fluorescent whitening group which comprises a "pendant fluorescent whitening group" has the structure

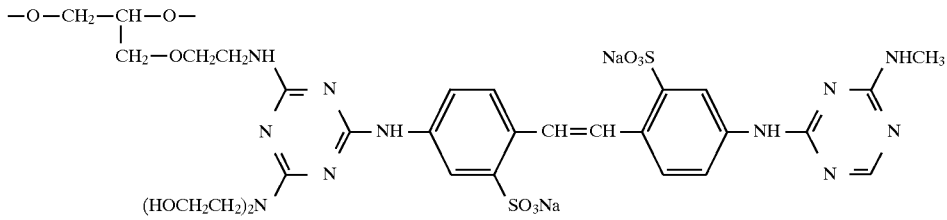

wherein the $R^5$ unit is a single chemical unit and the fluorescent whitening group is non-hydrolyzable from the backbone of the soil release polymer after incorporation.

Non-Fluorescent Whitening End-capping Units

In addition to the non-hydrolyzable fluorescent end-capping units, the soil release polymers or oligomers of the present invention comprise non fluorescent whitening end-capping units. These non-fluorescent whitening end-capping units serve several purposes. One role is to terminate the polymer backbone thereby ending chain propagation of the backbone and branching units. Also, the end capping units provide the soil release polymers of the present invention with certain intrinsic properties.

A preferred class of non-fluorescent whitening end-capping units are the ethoxylated or propoxylated hydroxyethane and propanesulfonate units of the formula $(MO_3S)(CH_2)_m(R^{11}O)_nR^{11}$—, wherein M is a salt-forming cation such as sodium or tetralkylammonium, $R^{11}$ is ethylene or propylene or a mixture thereof, m is 0 or 1, and n is 0 to 20. Preferred m is 0, preferred n is 0 to 6, preferred M is sodium or potassium, most preferred M is sodium.

Also a preferred class of non-fluorescent whitening end-capping units are the sulfoaroyl units of the formula —O(O)C($C_6H_4$)($SO_3^-M^+$), wherein M is a salt forming cation. Preferred M is sodium or potassium, more preferred is sodium.

Also a preferred class of non-fluorescent whitening end-capping units are the modified poly(oxyethylene)oxy monoalkyl ether units of the formula $R^{12}O$—$(CH_2CH_2O)_kCH_2CH_2$—, wherein $R^{12}$ contains from 1 to 4 carbon atoms and k is from about 3 to about 100. Preferred $R^{12}$ is methyl and ethyl, more preferred is methyl. Preferred k is from about 4 to about 45, more preferred about 5 to about 35.

A further preferred class of non-fluorescent whitening end-capping units are the ethoxylated or propoxylated phenolsulfonate end-capping units of the formula $MO_3S(C_6H_4)(OR^{13})_n$—, wherein n is from 1 to 20; M is a salt-forming cation; and $R^{13}$ is ethylene, propylene or mixtures thereof. Preferred $R^{13}$ is ethylene. Preferred n is 1 to 6, more preferred n is 1 to 3. Preferred M is sodium or potassium, more preferred is sodium.

LAUNDRY DETERGENT COMPOSITIONS

The laundry detergent compositions of the present invention in addition to the fluorescent whitening soil release polymers described herein above also comprise the following ingredients.

Surfactant—The instant cleaning compositions contain from about 0.1% to about 60% by weight of a surfactant selected from the group consisting of anionic, nonionic, ampholytic and zwitterionic surface active agents. For liquid systems, surfactant is preferably present to the extent of from about 0.1% to 30% by weight of the composition. For solid (i.e. granular) and viscous semi-solid (i.e. gelatinous, pastes, etc.) systems, surfactant is preferably present to the extent of from about 1.5% to 30% by weight of the composition.

Nonlimiting examples of surfactants useful herein typically at levels from about 1% to about 55%, by weight, include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+)CH_3$ and $CH_3(CH_2)_y(CHOSO_3^-M^+)CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10-18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are described further herein and are listed in standard texts.

Anionic surfactants can be broadly described as the water-soluble salts, particularly the alkali metal salts, of organic sulfuric reaction products having in their molecular structure an alkyl radical containing from about 8 to about 22 carbon atoms and a radical selected from the group consisting of sulfonic acid and sulfuric acid ester radicals. (Included in the term alkyl is the alkyl portion of higher acyl radicals.) Important examples of the anionic synthetic detergents which can form the surfactant component of the compositions of the present invention are the sodium or potassium alkyl sulfates, especially those obtained by sulfating the higher alcohols (C8–18 carbon atoms) produced by reducing the glycerides of tallow or coconut oil; sodium or potassium alkyl benzene sulfonates, in which the alkyl group contains from about 9 to about 15 carbon atoms, (the alkyl radical can be a straight or branched aliphatic chain); sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid ester of the reaction product of one mole of a higher fatty alcohol (e.g. tallow or coconut alcohols) and about 1 to about 10 moles of ethylene oxide; sodium or potassium salts of alkyl phenol ethylene oxide ether sulfates with about 1 to about 10 units of ethylene oxide per molecule and in which the alkyl radicals contain from 8 to 12 carbon atoms; the reaction products of fatty acids are derived from coconut oil sodium or potassium salts of fatty acid amides of a methyl tauride in which the fatty acids, for example, are derived from coconut oil and sodium or potassium beta-acetoxy- or beta-acetamido-alkanesulfonates where the alkane has from 8 to 22 carbon atoms.

Additionally, secondary alkyl sulfates may be used by the formulator exclusively or in conjunction with other surfactant materials and the following identifies and illustrates the differences between sulfated surfactants and otherwise conventional alkyl sulfate surfactants. Non-limiting examples of such ingredients are as follows.

Conventional primary alkyl sulfates (LAS), such as those illustrated above, have the general formula ROSO3–M+ wherein R is typically a linear C8–22 hydrocarbyl group and M is a water solublizing cation. Branched chain primary alkyl sulfate surfactants (i.e., branched-chain "PAS") having 8–20 carbon atoms are also know; see, for example, Eur. Pat. Appl. 439,316, Smith et al., filed Jan. 21, 1991.

Conventional secondary alkyl sulfate surfactants are those materials which have the sulfate moiety distributed randomly along the hydrocarbyl "backbone" of the molecule. Such materials may be depicted by the structure

$$CH_3(CH_2)_n(CHOSO_3^-M^+)(CH_2)_mCH_3$$

wherein m and n are integers of 2 of greater and the sum of m+n is typically about 9 to 17, and M is a water-solublizing cation.

The aforementioned secondary alkyl sulfates are those prepared by the addition of $H_2SO_4$ to olefins. A typical synthesis using alpha olefins and sulfuric acid is disclosed in U.S. Pat. No. 3,234,258, Morris, issued Feb. 8, 1966 or in U.S. Pat. No. 5,075,041, Lutz, issued Dec. 24, 1991. See also U.S. Pat. No. 5,349,101, Lutz et al., issued Sep. 20, 1994; U.S. Pat. No. 5,389,277, Prieto, issued Feb. 14, 1995.

ADJUNCT INGREDIENTS

Enzymes—Enzymes can be included in the present detergent compositions for a variety of purposes, including removal of protein-based, carbohydrate-based, or triglyceride-based stains from surfaces such as textiles or dishes, for the prevention of refugee dye transfer, for example in laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH-activity and/or stability optima, thermostability, and stability to active detergents, builders and the like. In this respect bacterial or fungal enzymes are preferred, such as bacterial amylases and proteases, and fungal cellulases.

"Detersive enzyme", as used herein, means any enzyme having a cleaning, stain removing or otherwise beneficial effect in a laundry, hard surface cleaning or personal care detergent composition. Preferred detersive enzymes are hydrolases such as proteases, amylases and lipases. Preferred enzymes for laundry purposes include, but are not limited to, proteases, cellulases, lipases and peroxidases. Highly preferred for automatic dishwashing are amylases and/or proteases, including both current commercially available types and improved types which, though more and more bleach compatible though successive improvements, have a remaining degree of bleach deactivation susceptibility.

Enzymes are normally incorporated into detergent or detergent additive compositions at levels sufficient to provide a "cleaning-effective amount". The term "cleaning effective amount" refers to any amount capable of producing a cleaning, stain removal, soil removal, whitening, deodorizing, or freshness improving effect on substrates such as fabrics, dishware and the like. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. Protease enzymes are usually present in such commercial preparations at levels sufficient to provide from 0.005 to 0.1 Anson units (AU) of activity per gram of composition. Higher active levels may also be desirable in highly concentrated detergent formulations.

Suitable examples of proteases are the subtilisins which are obtained from particular strains of *B. subtilis* and *B. licheniformis*. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International Bio-Synthetics, Inc., The Netherlands; as well as Protease A as disclosed in EP 130,756 A, Jan. 9, 1985 and Protease B as disclosed in EP 303,761 A, Apr. 28, 1987 and EP 130,756 A, Jan. 9, 1985. See also a high pH protease from Bacillus sp. NCIMB 40338 described in WO 9318140 A to Novo. Enzymatic detergents comprising protease, one or more other enzymes, and a reversible protease inhibitor are described in WO 9203529 A to Novo. Other preferred proteases include those of WO 9510591 A to Procter & Gamble. When desired, a protease having decreased adsorption and increased hydrolysis is available as described in WO 9507791 to Procter & Gamble. A recombinant trypsin-like protease for detergents suitable herein is described in WO 9425583 to Novo.

In more detail, an especially preferred protease, referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, preferably also in combination with one or more amino acid residue positions equivalent to those selected from the group consisting of +99, +101, +103, +104, +107, +123, +27, +105, +109, +126, +128, +135, +156, +166, +195, +197, +204, +206, +210, +216, +217, +218, +222, +260, +265, and/or +274 according to the numbering of *Bacillus amyloliquefaciens* subtilisin, as described in the patent applications of A. Baeck, et al, entitled "Protease-Containing Cleaning Compositions" having U.S. Ser. No. 08/322,676, and C. Ghosh, et al, "Bleaching Compositions Comprising Protease Enzymes" having U.S. Ser. No. 08/322,677, both filed Oct. 13, 1994.

Amylases suitable herein, especially for, but not limited to automatic dishwashing purposes, include, for example, α-amylases described in GB 1,296,839 to Novo; RAPIDASE®, International Bio-Synthetics, Inc. and TERMAMYL®, Novo. FUNGAMYL® from Novo is especially useful. Engineering of enzymes for improved stability, e.g., oxidative stability, is known. See, for example J. Biological Chem., Vol. 260, No. 11, June 1985, pp 6518–6521. These preferred amylases herein share the characteristic of being "stability-enhanced" amylases, characterized, at a minimum, by a measurable improvement in one or more of: oxidative stability, e.g., to hydrogen peroxide/tetraacetylethylenediamine in buffered solution at pH 9–10; thermal stability, e.g., at common wash temperatures such as about 60° C.; or alkaline stability, e.g., at a pH from about 8 to about 11, measured versus the above-identified reference-point amylase. Stability can be measured using any of the art-disclosed technical tests. See, for example, references disclosed in WO 9402597. Stability-enhanced amylases can be obtained from Novo or from Genencor International. One class of highly preferred amylases herein have the commonality of being derived using site-directed mutagenesis from one or more of the Baccillus amylases, especialy the Bacillus α-amylases, regardless of whether one, two or multiple amylase strains are the immediate precursors. Oxidative stability-enhanced amylases vs. the above-identified reference amylase are preferred for use, especially in bleaching, more preferably oxygen bleaching, as distinct from chlorine bleaching, detergent compositions herein. Such preferred amylases include (a) an amylase according to the hereinbefore incorporated WO 9402597, Novo, Feb. 3, 1994, as further illustrated by a mutant in which substitution is made, using alanine or threonine, preferably threonine, of the methionine residue located in position 197 of the *B. licheniformis* alpha-amylase, known as TERMAMYL®, or the homologous position variation of a similar parent amylase, such as *B. amyloliquefaciens, B. subtilis,* or *B. stearothermophilus,* (b) stability-enhanced amylases as described by Genencor International in a paper entitled "Oxidatively Resistant alpha-Amylases" presented at the 207th American Chemical Society National Meeting, Mar. 13–17 1994, by C. Mitchinson. Methionine (Met) was identified as the most likely residue to be modified. Met was substituted, one at a time, in positions 8, 15, 197, 256, 304, 366 and 438 leading to specific mutants, particularly important being M197L and M197T with the M197T variant being the most stable expressed variant. Other particularly preferred oxidative stability enhanced amylase include those described in WO 9418314 to Genencor International and WO 9402597 to Novo. Any other oxidative stability-enhanced amylase can be used, for example as derived by site-directed mutagenesis from known chimeric, hybrid or simple mutant parent forms of available amylases. Other preferred enzyme modifications are accessible. See WO 9509909 A to Novo.

Cellulases usable herein include both bacterial and fungal types, preferably having a pH optimum between 5 and 9.5. U.S. Pat. No. 4,435,307, Barbesgoard et al, Mar. 6, 1984, discloses suitable fungal cellulases from *Humicola insolens* or Humicola strain DSM 1800 or a cellulase 212-producing fungus belonging to the genus Aeromonas, and cellulase extracted from the hepatopancreas of a marine mollusk, Dolabella Auricula Solander. Suitable cellulases are also disclosed in GB-A-2.075.028; GB-A-2.095.275 and DE-OS-2.247.832. CAREZYME® (Novo) is especially useful. See also WO 9117243 to Novo.

Suitable lipase enzymes for detergent usage include those produced by microorganisms of the Pseudomonas group, such as *Pseudomonas stutzeri* ATCC 19.154, as disclosed in GB 1,372,034. See also lipases in Japanese Pat. No. Application 53,20487, laid open Feb. 24, 1978. This lipase is available from Amano Pharmaceutical Co. Ltd., Nagoya, Japan, under the trade name Lipase P "Amano," or "Amano-P." Other suitable commercial lipases include Amano-CES, lipases ex *Chromobacter viscosum,* e.g. *Chromobacter viscosum var. lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli.* LIPOLASE® enzyme derived from *Humicola lanuginosa* and commercially available from Novo, see also EP 341,947, is a preferred lipase for use herein. Lipase and amylase variants stabilized against peroxidase enzymes are described in WO 9414951 A to Novo. See also WO 9205249 and RD 94359044.

Cutinase enzymes suitable for use herein are described in WO 8809367 A to Genencor.

Peroxidase enzymes may be used in combination with oxygen sources, e.g., percarbonate, perborate, hydrogen peroxide, etc., for "solution bleaching" or prevention of transfer of dyes or pigments removed from substrates during the wash to other substrates present in the wash solution. Known peroxidases include horseradish peroxidase, ligninase, and haloperoxidases such as chloro- or bromo-peroxidase. Peroxidase-containing detergent compositions are disclosed in WO 89099813 A, Oct. 19, 1989 to Novo and WO 8909813 A to Novo.

A range of enzyme materials and means for their incorporation into synthetic detergent compositions is also disclosed in WO 9307263 A and WO 9307260 A to Genencor International, WO 8908694 A to Novo, and U.S. Pat. No. 3,553,139, Jan. 5, 1971 to McCarty et al. Enzymes are further disclosed in U.S. Pat. No. 4,101,457, Place et al, Jul. 18, 1978, and in U.S. Pat. No. 4,507,219, Hughes, Mar. 26, 1985. Enzyme materials useful for liquid detergent formulations, and their incorporation into such formulations, are disclosed in U.S. Pat. No. 4,261,868, Hora et al, Apr. 14, 1981. Enzymes for use in detergents can be stabilized by various techniques. Enzyme stabilization techniques are disclosed and exemplified in U.S. Pat. No. 3,600,319, Aug. 17, 1971, Gedge et al, EP 199,405 and EP 200,586, Oct. 29, 1986, Venegas. Enzyme stabilization systems are also described, for example, in U.S. Pat. No. 3,519,570. A useful Bacillus, sp. AC13 giving proteases, xylanases and cellulases, is described in WO 9401532 A to Novo.

Enzyme Stabilizing System—Enzyme-containing, including but not limited to, liquid compositions, herein may comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

One stabilizing approach is the use of water-soluble sources of calcium and/or magnesium ions in the finished compositions which provide such ions to the enzymes. Calcium ions are generally more effective than magnesium ions and are preferred herein if only one type of cation is being used. Typical detergent compositions, especially liquids, will comprise from about 1 to about 30, preferably from about 2 to about 20, more preferably from about 8 to about 12 millimoles of calcium ion per liter of finished detergent composition, though variation is possible depending on factors including the multiplicity, type and levels of enzymes incorporated. Preferably water-soluble calcium or magnesium salts are employed, including for example calcium chloride, calcium hydroxide, calcium formate, calcium malate, calcium maleate, calcium hydroxide and calcium acetate; more generally, calcium sulfate or magnesium salts corresponding to the exemplified calcium salts may be used. Further increased levels of Calcium and/or Magnesium may of course be useful, for example for promoting the grease-cutting action of certain types of surfactant.

Another stabilizing approach is by use of borate species. See Severson, U.S. Pat. No. 4,537,706. Borate stabilizers, when used, may be at levels of up to 10% or more of the composition though more typically, levels of up to about 3% by weight of boric acid or other borate compounds such as borax or orthoborate are suitable for liquid detergent use. Substituted boric acids such as phenylboronic acid, butaneboronic acid, p-bromophenylboronic acid or the like can be used in place of boric acid and reduced levels of total boron in detergent compositions may be possible though the use of such substituted boron derivatives.

Stabilizing systems of certain cleaning compositions may further comprise from 0 to about 10%, preferably from about 0.01% to about 6% by weight, of chlorine bleach scavengers, added to prevent chlorine bleach species present in many water supplies from attacking and inactivating the enzymes, especially under alkaline conditions. While chlorine levels in water may be small, typically in the range from about 0.5 ppm to about 1.75 ppm, the available chlorine in the total volume of water that comes in contact with the enzyme, for example during dish- or fabric-washing, can be relatively large; accordingly, enzyme stability to chlorine in-use is sometimes problematic. Since perborate or percarbonate, which have the ability to react with chlorine bleach, may present in certain of the instant compositions in amounts accounted for separately from the stabilizing system, the use of additional stabilizers against chlorine, may, most generally, not be essential, though improved results may be obtainable from their use. Suitable chlorine scavenger anions are widely known and readily available, and, if used, can be salts containing ammonium cations with sulfite, bisulfite, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can likewise be used. Likewise, special enzyme inhibition systems can be incorporated such that different enzymes have maximum compatibility. Other conventional scavengers such as bisulfate, nitrate, chloride, sources of hydrogen peroxide such as sodium perborate tetrahydrate, sodium perborate monohydrate and sodium percarbonate, as well as phosphate, condensed phosphate, acetate, benzoate, citrate, formate, lactate, malate, tartrate, salicylate, etc., and mixtures thereof can be used if desired. In general, since the chlorine scavenger function can be performed by ingredients separately listed under better recognized functions, (e.g., hydrogen peroxide sources), there is no absolute requirement to add a separate chlorine scavenger unless a compound performing that function to the desired extent is absent from an enzyme-containing embodiment of the invention; even then, the scavenger is added only for opti-mum results. Moreover, the formulator will exercise a chemist's normal skill in avoiding the use of any enzyme scavenger or stabilizer which is majorly incompatible, as formulated, with other reactive ingredients, if used. In relation to the use of ammonium salts, such salts can be simply admixed with the detergent composition but are prone to adsorb water and/or liberate ammonia during storage. Accordingly, such materials, if present, are desirably protected in a particle such as that described in U.S. Pat. No. 4,652,392, Baginski et al.

Bleaching Compounds—Bleaching Agents and Bleach Activators—The detergent compositions herein may optionally contain bleaching agents or bleaching compositions containing a bleaching agent and one or more bleach activators. When present, bleaching agents will typically be at levels of from about 1% to about 30%, more typically from about 5% to about 20%, of the detergent composition, especially for fabric laundering. If present, the amount of bleach activators will typically be from about 0.1% to about 60%, more typically from about 0.5% to about 40% of the bleaching composition comprising the bleaching agent-plus-bleach activator.

The bleaching agents used herein can be any of the bleaching agents useful for detergent compositions in textile cleaning, hard surface cleaning, or other cleaning purposes that are now known or become known. These include oxygen bleaches as well as other bleaching agents. Perborate bleaches, e.g., sodium perborate (e.g., mono- or tetrahydrate) can be used herein.

Another category of bleaching agent that can be used without restriction encompasses percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. No. 4,483,781, Hartman, issued Nov. 20, 1984, U.S. patent application Ser. No. 740,446, Burns et al, filed Jun. 3, 1985, European Patent Application 0,133,354, Banks et al, published Feb. 20, 1985, and U.S. Pat. No. 4,412,934, Chung et al, issued Nov. 1, 1983. Highly preferred bleaching agents also include 6-nonylamino-6-oxoperoxycaproic acid as described in U.S. Pat. No. 4,634,551, issued Jan. 6, 1987 to Burns et al.

Peroxygen bleaching agents can also be used. Suitable peroxygen bleaching compounds include sodium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with silicate, borate or water-soluble surfactants. Percarbonate is available from various commercial sources such as FMC, Solvay and Tokai Denka.

Mixtures of bleaching agents can also be used.

Peroxygen bleaching agents, the perborates, the percarbonates, etc., are preferably combined with bleach activators, which lead to the in silu production in aqueous solution (i.e., during the washing process) of the peroxy acid corresponding to the bleach activator. Various nonlimiting examples of activators are disclosed in U.S. Pat. No. 4,915, 854, issued Apr. 10, 1990 to Mao et al, and U.S. Pat. No. 4,412,934. The nonanoyloxybenzene sulfonate (NOBS) and tetraacetyl ethylene diamine (TAED) activators are typical, and mixtures thereof can also be used. See also U.S. Pat. No. 4,634,551 for other typical bleaches and activators useful herein.

Highly preferred amido-derived bleach activators are those of the formulae:

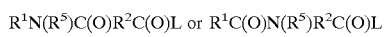
$R^1N(R^5)C(O)R^2C(O)L$ or $R^1C(O)N(R^5)R^2C(O)L$ wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. A leaving group is any group that is displaced from the bleach activator as a consequence of the nucleophilic attack on the bleach activator by the perhydrolysis anion. A preferred leaving group is phenyl sulfonate.

Preferred examples of bleach activators of the above formulae include (6-octanamido-caproyl) oxybenzenesulfonate, (6-nonanamidocaproyl) oxybenzenesulfonate, (6-decanamido-caproyl) oxybenzenesulfonate, and mixtures thereof as described in U.S. Pat. No. 4,634,551, incorporated herein by reference.

Another class of bleach activators comprises the benzoxazin-type activators disclosed by Hodge et al in U.S. Pat. No. 4,966,723, issued Oct. 30, 1990, incorporated herein by reference. A highly preferred activator of the benzoxazin-type is:

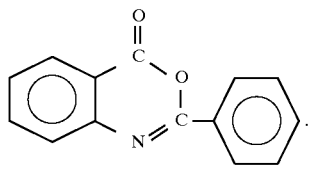

Still another class of preferred bleach activators includes the acyl lactam activators, especially acyl caprolactams and acyl valerolactams of the formulae:

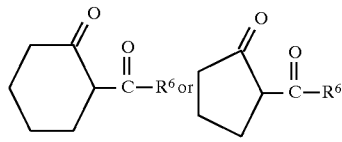

wherein $R^6$ is H or an alkyl, aryl, alkoxyaryl, or alkaryl group containing from 1 to about 12 carbon atoms. Highly preferred lactam activators include benzoyl caprolactam, octanoyl caprolactam, 3,5,5-trimethylhexanoyl caprolactam, nonanoyl caprolactam, decanoyl caprolactam, undecenoyl caprolactam, benzoyl valerolactam, octanoyl valerolactam, decanoyl valerolactam, undecenoyl valerolactam, nonanoyl valerolactam, 3,5,5-trimethylhexanoyl valerolactam and mixtures thereof. See also U.S. Pat. No. 4,545,784, issued to Sanderson, Oct. 8, 1985, incorporated herein by reference, which discloses acyl caprolactams, including benzoyl caprolactam, adsorbed into sodium perborate.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. See U.S. Pat. No. 4,033,718, issued Jul. 5, 1977 to Holcombe et al. If used, detergent compositions will typically contain from about 0.025% to about 1.25%, by weight, of such bleaches, especially sulfonate zinc phthalocyanine.

If desired, the bleaching compounds can be catalyzed by means of a manganese compound. Such compounds are well known in the art and include, for example, the manganese-based catalysts disclosed in U.S. Pat. No. 5,246,621, U.S. Pat. No. 5,244,594; U.S. Pat. No. 5,194,416; U.S. Pat. No. 5,114,606; and European Pat. App. Pub. Nos. 549,271A1, 549,272A1, 544,440A2, and 544,490A1; Preferred examples of these catalysts include $Mn^{IV}_2(u\text{-}O)_3(1,4,7\text{-}trimethyl-1,4,7\text{-}triazacyclo-nonane)_2(PF_6)_2$, $Mn^{III}_2(u\text{-}O)_1(u\text{-}OAc)_2(1,4,7\text{-}trimethyl-1,4,7\text{-}triazacyclononane)_2\text{-}(ClO_4)_2$, $Mn^{IV}_4(u\text{-}O)_6(1,4,7\text{-}triazacyclononane)_4(ClO_4)_4$, $Mn^{III}Mn^{IV}_4(u\text{-}O)_1(u\text{-}OAc)_2(1,4,7\text{-}trimethyl-1,4,7\text{-}triazacyclononane)_2(ClO_4)_3$, $Mn^{IV}(1,4,7\text{-}trimethyl-1,4,7\text{-}triazacyclononane)\text{-}(OCH_3)_3(PF_6)$, and mixtures thereof. Other metal-based bleach catalysts include those disclosed in U.S. Pat. No. 4,430,243 and U.S. Pat. No. 5,114,611. The use of manganese with various complex ligands to enhance bleaching is also reported in the following U.S. Pat. Nos.: 4,728,455; 5,284,944; 5,246,612; 5,256,779; 5,280,117; 5,274,147; 5,153,161; and 5,227,084.

As a practical matter, and not by way of limitation, the compositions and processes herein can be adjusted to provide on the order of at least one part per ten million of the active bleach catalyst species in the aqueous washing liquor, and will preferably provide from about 0.1 ppm to about 700 ppm, more preferably from about 1 ppm to about 500 ppm, of the catalyst species in the laundry liquor.

Builders—Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least about 1% builder. Liquid formulations typically comprise from about 5% to about 50%, more typically about 5% to about 30%, by weight, of detergent builder. Granular formulations typically comprise from about 10% to about 80%, more typically from about 15% to about 50% by weight, of the detergent builder. Lower or higher levels of builder, however, are not meant to be excluded.

Inorganic or P-containing detergent builders include, but are not limited to, the alkali metal, ammonium and alkanolammonium salts of polyphosphates (exemplified by the tripolyphosphates, pyrophosphates, and glassy polymeric metaphosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2:Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6 is the trademark for a crystalline layered silicate marketed by Hoechst (commonly abbreviated herein as "SKS-6"). Unlike zeolite builders, the NaSKS-6 silicate builder does not contain aluminum. NaSKS-6 has the delta-$Na_2SiO_5$ morphology form of layered silicate. It can be prepared by methods such as those described in German DE-A-3,417,649 and DE-A-3,742,043. SKS-6 is a highly preferred layered silicate for use herein, but other such layered silicates, such as those having the general formula NaMSi$_x$O$_{2x+1}$.yH$_2$O wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-Na$_2$SiO$_5$ (NaSKS-6 form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Patent Application No. 2,321,001 published on Nov. 15, 1973.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

$$M_z(zAlO_2)_y].xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P(B), Zeolite MAP and Zeolite X. In an especially preferred embodiment, the crystalline aluminosilicate ion exchange material has the formula:

$$Na_{12}[(AlO_2)_{12}(SiO_2)_{12}].xH_2O$$

wherein x is from about 20 to about 30, especially about 27. This material is known as Zeolite A. Dehydrated zeolites (x=0–10) may also be used herein. Preferably, the aluminosilicate has a particle size of about 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations due to their availability from renewable resources and their biodegradability. Citrates can also be used in granular compositions, especially in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the C$_5$–C$_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also Diehl U.S. Pat. No. 3,723,322.

Fatty acids, e.g., C$_{12}$–C$_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Other Polymeric Soil Release Agents—Any polymeric soil release agent known to those skilled in the art can optionally be employed in the compositions and processes of this invention. Polymeric soil release agents are characterized by having both hydrophilic segments, to hydrophilize the surface of hydrophobic fibers, such as polyester and nylon, and hydrophobic segments, to deposit upon hydrophobic fibers and remain adhered thereto through completion of washing and rinsing cycles and, thus, serve as an anchor for the hydrophilic segments. This can enable stains occurring subsequent to treatment with the soil release agent to be more easily cleaned in later washing procedures.

The polymeric soil release agents useful herein especially include those soil release agents having: (a) one or more nonionic hydrophile components consisting essentially of (i) polyoxyethylene segments with a degree of polymerization of at least 2, or (ii) oxypropylene or polyoxypropylene segments with a degree of polymerization of from 2 to 10, wherein said hydrophile segment does not encompass any oxypropylene unit unless it is bonded to adjacent moieties at each end by ether linkages, or (iii) a mixture of oxyalkylene units comprising oxyethylene and from 1 to about 30 oxypropylene units wherein said mixture contains a sufficient amount of oxyethylene units such that the hydrophile component has hydrophilicity great enough to increase the hydrophilicity of conventional polyester synthetic fiber surfaces upon deposit of the soil release agent on such surface, said hydrophile segments preferably comprising at least about 25% oxyethylene units and more preferably, especially for such components having about 20 to 30 oxypropylene units, at least about 50% oxyethylene units; or (b) one or more hydrophobe components comprising (i) $C_3$ oxyalkylene terephthalate segments, wherein, if said hydrophobe components also comprise oxyethylene terephthalate, the ratio of oxyethylene terephthalate:$C_3$ oxyalkylene terephthalate units is about 2:1 or lower, (ii) $C_4$–$C_6$ alkylene or oxy $C_4$–$C_6$ alkylene segments, or mixtures therein, (iii) poly (vinyl ester) segments, preferably polyvinyl acetate), having a degree of polymerization of at least 2, or (iv) $C_1$–$C_4$ alkyl ether or $C_4$ hydroxyalkyl ether substituents, or mixtures therein, wherein said substituents are present in the form of $C_1$–$C_4$ alkyl ether or $C_4$ hydroxyalkyl ether cellulose derivatives, or mixtures therein, and such cellulose derivatives are amphiphilic, whereby they have a sufficient level of $C_1$–$C_4$ alkyl ether and/or $C_4$ hydroxyalkyl ether units to deposit upon conventional polyester synthetic fiber surfaces and retain a sufficient level of hydroxyls, once adhered to such conventional synthetic fiber surface, to increase fiber surface hydrophilicity, or a combination of (a) and (b).

Typically, the polyoxyethylene segments of (a)(i) will have a degree of polymerization of up to about 200, although higher levels can be used, preferably from 3 to about 150, more preferably from 6 to about 100. Suitable oxy $C_4$–$C_6$ alkylene hydrophobe segments include, but are not limited to, end-caps of polymeric soil release agents such as $MO_3S(CH_2)_nOCH_2CH_2O$—, where M is sodium and n is an integer from 4–6, as disclosed in U.S. Pat. No. 4,721,580, issued Jan. 26, 1988 to Gosselink.

Polymeric soil release agents useful in the present invention also include cellulosic derivatives such as hydroxyether cellulosic polymers, and the like. Such agents are commercially available and include hydroxyethers of cellulose such as METHOCEL (Dow). Cellulosic soil release agents for use herein also include those selected from the group consisting of $C_1$–$C_4$ alkyl and $C_4$ hydroxyalkyl cellulose; see U.S. Pat. No. 4,000,093, issued Dec. 28, 1976 to Nicol, et al.

Soil release agents characterized by poly(vinyl ester) hydrophobe segments include graft copolymers of poly (vinyl ester), e.g., $C_1$–$C_6$ vinyl esters, preferably poly(vinyl acetate) grafted onto polyalkylene oxide backbones, such as polyethylene oxide backbones. See European Patent Application 0 219 048, published Apr. 22, 1987 by Kud, et al. Commercially available soil release agents of this kind include the SOKALAN type of material, e.g., SOKALAN HP-22, available from BASF (Germany).

One type of preferred soil release agent is a copolymer having random blocks of ethylene terephthalate and polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

Another preferred polymeric soil release agent is a polyester with repeat units of ethylene terephthalate units contains 10–15% by weight of ethylene terephthalate units together with 90–80% by weight of polyoxyethylene terephthalate units, derived from a polyoxyethylene glycol of average molecular weight 300–5,000. Examples of this polymer include the commercially available material ZELCON 5126 (from Dupont) and MILEASE T (from ICI). See also U.S. Pat. No. 4,702,857, issued Oct. 27, 1987 to Gosselink.

Another preferred polymeric soil release agent is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No. 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. No. 4,702,857, issued Oct. 27, 1987 to Gosselink.

Preferred polymeric soil release agents also include the soil release agents of U.S. Pat. No. 4,877,896, issued Oct. 31, 1989 to Maldonado et al, which discloses anionic, especially sulfoaroyl, end-capped terephthalate esters.

Still another preferred soil release agent is an oligomer with repeat units of terephthaloyl units, sulfoisoterephthaloyl units, oxyethyleneoxy and oxy-1,2-propylene units. The repeat units form the backbone of the oligomer and are preferably terminated with modified isethionate end-caps. A particularly preferred soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)-ethanesulfonate. Said soil release agent also comprises from about 0.5% to about 20%, by weight of the oligomer, of a crystalline-reducing stabilizer, preferably selected from the group consisting of xylene sulfonate, cumene sulfonate, toluene sulfonate, and mixtures thereof.

If utilized, soil release agents will generally comprise from about 0.01% to about 10.0%, by weight, of the detergent compositions herein, typically from about 0.1% to about 5%, preferably from about 0.2% to about 3.0%.

Chelating Agents—The detergent compositions herein may also optionally contain one or more iron and/or manganese chelating agents. Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates.

Amino carboxylates useful as optional chelating agents include ethylenediaminetetracetates, N-hydroxyethylethylenediaminetriacetates, nitrilotriacetates, ethylenediamine tetraprorionates, triethylenetetraaminehexacetates, diethylenetriaminepentaacetates, and ethanoldiglycines, alkali metal, ammonium, and substituted ammonium salts therein and mixtures therein.

Amino phosphonates are also suitable for use as chelating agents in the compositions of the invention when at lease low levels of total phosphorus are permitted in detergent compositions, and include ethylenediaminetetrakis (methylenephosphonates) as DEQUEST. Preferred, these amino phosphonates to not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelator for use herein is ethylenediamine disuccinate ("EDDS"), especially the [S,S] isomer as described in U.S. Pat. No. 4,704,233, Nov. 3, 1987, to Hartman and Perkins.

If utilized, these chelating agents will generally comprise from about 0.1% to about 10% by weight of the detergent compositions herein. More preferably, if utilized, the chelating agents will comprise from about 0.1% to about 3.0% by weight of such compositions.

Clay Soil Removal/Anti-redeposition Agents—The compositions of the present invention can also optionally contain water-soluble ethoxylated amines having clay soil removal and antiredeposition properties. Granular detergent compositions which contain these compounds typically contain from about 0.01% to about 10.0% by weight of the water-soluble ethoxylates amines; liquid detergent compositions typically contain about 0.01% to about 5%.

The most preferred soil release and anti-redeposition agent is ethoxylated tetraethylenepentamine. Exemplary ethoxylated amines are further described in U.S. Pat. No. 4,597,898, VanderMeer, issued Jul. 1, 1986. Another group of preferred clay soil removal-antiredeposition agents are the cationic compounds disclosed in European Patent Application 111,965, Oh and Gosselink, published Jun. 27, 1984. Other clay soil removal/antiredeposition agents which can be used include the ethoxylated amine polymers disclosed in European Patent Application 111,984, Gosselink, published Jun. 27, 1984; the zwitterionic polymers disclosed in European Patent Application 112,592, Gosselink, published Jul. 4, 1984; and the amine oxides disclosed in U.S. Pat. No. 4,548,744, Connor, issued Oct. 22, 1985. Other clay soil removal and/or anti redeposition agents known in the art can also be utilized in the compositions herein. Another type of preferred antiredeposition agent includes the carboxy methyl cellulose (CMC) materials. These materials are well known in the art.

Polymeric Dispersing, Agents—Polymeric dispersing agents can advantageously be utilized at levels from about 0.1% to about 7%, by weight, in the compositions herein, especially in the presence of zeolite and/or layered silicate builders. Suitable polymeric dispersing agents include polymeric polycarboxylates and polyethylene glycols, although others known in the art can also be used. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition.

Polymeric polycarboxylate materials can be prepared by polymerizing or copolymerizing suitable unsaturated monomers, preferably in their acid form. Unsaturated monomeric acids that can be polymerized to form suitable polymeric polycarboxylates include acrylic acid, maleic acid (or maleic anhydride), fumaric acid, itaconic acid, aconitic acid, mesaconic acid, citraconic acid and methylenemalonic acid. The presence in the polymeric polycarboxylates herein or monomeric segments, containing no carboxylate radicals such as vinylmethyl ether, styrene, ethylene, etc. is suitable provided that such segments do not constitute more than about 40% by weight.

Particularly suitable polymeric polycarboxylates can be derived from acrylic acid. Such acrylic acid-based polymers which are useful herein are the water-soluble salts of polymerized acrylic acid. The average molecular weight of such polymers in the acid form preferably ranges from about 2,000 to 10,000, more preferably from about 4,000 to 7,000 and most preferably from about 4,000 to 5,000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in Diehl, U.S. Pat. No. 3,308,067, issued Mar. 7, 1967.

Acrylic/maleic-based copolymers may also be used as a preferred component of the dispersing/anti-redeposition agent. Such materials include the water-soluble salts of copolymers of acrylic acid and maleic acid. The average molecular weight of such copolymers in the acid form preferably ranges from about 2,000 to 100,000, more preferably from about 5,000 to 75,000, most preferably from about 7,000 to 65,000. The ratio of acrylate to maleate segments in such copolymers will generally range from about 30:1 to about 1:1, more preferably from about 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described in European Patent Application No. 66915, published Dec. 15, 1982, as well as in EP 193,360, published Sep. 3, 1986, which also describes such polymers comprising hydroxypropylacrylate. Still other useful dispersing agents include the maleic/acrylic/vinyl alcohol terpolymers. Such materials are also disclosed in EP 193,360, including, for example, the 45/45/10 terpolymer of acrylic/maleic/vinyl alcohol.

Another polymeric material which can be included is polyethylene glycol (PEG). PEG can exhibit dispersing agent performance as well as act as a clay soil removal-antiredeposition agent. Typical molecular weight ranges for these purposes range from about 500 to about 100,000, preferably from about 1,000 to about 50,000, more preferably from about 1,500 to about 10,000.

Polyaspartate and polyglutamate dispersing agents may also be used, especially in conjunction with zeolite builders. Dispersing agents such as polyaspartate preferably have a molecular weight (avg.) of about 10,000.

Suds Suppressors—Compounds for reducing or suppressing the formation of suds can be incorporated into the compositions of the present invention. Suds suppression can be of particular importance in the so-called "high concentration cleaning process" as described in U.S. Pat. No. 4,489,455 and 4,489,574 and in front-loading European-style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430–447 (John Wiley & Sons, Inc., 1979). One category of suds suppressor of particular interest encompasses monocarboxylic fatty acid and soluble salts therein. See U.S. Pat. No. 2,954,347, issued Sep. 27, 1960 to Wayne St. John. The monocarboxylic fatty acids and salts thereof used as suds suppressor typically have hydrocarbyl chains of 10 to about 24 carbon atoms, preferably 12 to 18 carbon atoms. Suitable salts include the alkali metal salts such as sodium, potassium, and lithium salts, and ammonium and alkanolammonium salts.

The detergent compositions herein may also contain non-surfactant suds suppressors. These include, for example: high molecular weight hydrocarbons such as paraffin, fatty acid esters (e.g., fatty acid triglycerides), fatty acid esters of monovalent alcohols, aliphatic $C_{18}$–$C_{40}$ ketones (e.g., stearone), etc. Other suds inhibitors include N-alkylated amino triazines such as tri- to hexa-alkylmelamines or di- to tetra-alkyldiamine chlortriazines formed as products of cyanuric chloride with two or three moles of a primary or secondary amine containing 1 to 24 carbon atoms, propylene oxide, and monostearyl phosphates such as monostearyl alcohol phosphate ester and monostearyl di-alkali metal (e.g., K, Na, and Li) phosphates and phosphate esters. The hydrocarbons such as paraffin and haloparaffin can be utilized in liquid form. The liquid hydrocarbons will be liquid at room temperature and atmospheric pressure, and will have a pour point in the range of about −40° C. and about 50° C., and a minimum boiling point not less than about 110° C. (atmospheric pressure). It is also known to utilize waxy hydrocarbons, preferably having a melting point below about 100° C. The hydrocarbons constitute a preferred category of suds suppressor for detergent compositions. Hydrocarbon suds suppressors are described, for example, in U.S. Pat. No. 4,265,779, issued May 5, 1981 to Gandolfo et al. The hydrocarbons, thus, include aliphatic, alicyclic, aromatic, and heterocyclic saturated or unsaturated hydrocarbons having from about 12 to about 70 carbon atoms. The term "paraffin," as used in this suds suppressor discussion, is intended to include mixtures of true paraffins and cyclic hydrocarbons.

Another preferred category of non-surfactant suds suppressors comprises silicone suds suppressors. This category includes the use of polyorganosiloxane oils, such as polydimethylsiloxane, dispersions or emulsions of polyorganosiloxane oils or resins, and combinations of polyorganosiloxane with silica particles wherein the polyorganosiloxane is chemisorbed or fused onto the silica. Silicone suds suppressors are well known in the art and are, for example, disclosed in U.S. Pat. No. 4,265,779, issued May 5, 1981 to Gandolfo et al and European Patent Application No. 89307851.9, published Feb. 7, 1990, by Starch, M. S.

Other silicone suds suppressors are disclosed in U.S. Pat. No. 3,455,839 which relates to compositions and processes for defoaming aqueous solutions by incorporating therein small amounts of polydimethylsiloxane fluids.

Mixtures of silicone and silanated silica are described, for instance, in German Patent Application DOS 2,124,526. Silicone defoamers and suds controlling agents in granular detergent compositions are disclosed in U.S. Pat. No. 3,933,672, Bartolotta et al, and in U.S. Pat. No. 4,652,392, Baginski et al, issued Mar. 24, 1987.

An exemplary silicone based suds suppressor for use herein is a suds suppressing amount of a suds controlling agent consisting essentially of:

(i) polydimethylsiloxane fluid having a viscosity of from about 20 cs. to about 1,500 cs. at 25° C.;

(ii) from about 5 to about 50 parts per 100 parts by weight of (i) of siloxane resin composed of $(CH_3)_3SiO_{1/2}$ units of $SiO_2$ units in a ratio of from $(CH_3)_3SiO_{1/2}$ units and to $SiO_2$ units of from about 0.6:1 to about 1.2:1; and (iii) from about 1 to about 20 parts per 100 parts by weight of (i) of a solid silica gel.

In the preferred silicone suds suppressor used herein, the solvent for a continuous phase is made up of certain polyethylene glycols or polyethylene-polypropylene glycol copolymers or mixtures thereof (preferred), or polypropylene glycol. The primary silicone suds suppressor is branched/crosslinked and preferably not linear.

To illustrate this point further, typical liquid laundry detergent compositions with controlled suds will optionally comprise from about 0.001 to about 1, preferably from about 0.01 to about 0.7, most preferably from about 0.05 to about 0.5, weight % of said silicone suds suppressor, which comprises (1) a nonaqueous emulsion of a primary antifoam agent which is a mixture of (a) a polyorganosiloxane, (b) a resinous siloxane or a silicone resin-producing silicone compound, (c) a finely divided filler material, and (d) a catalyst to promote the reaction of mixture components (a), (b) and (c), to form silanolates; (2) at least one nonionic silicone surfactant; and (3) polyethylene glycol or a copolymer of polyethylene-polypropylene glycol having a solubility in water at room temperature of more than about 2 weight %; and without polypropylene glycol. Similar amounts can be used in granular compositions, gels, etc. See also U.S. Pat. Nos. 4,978,471, Starch, issued Dec. 18, 1990, and 4,983,316, Starch, issued Jan. 8, 1991, 5,288,431, Huber et al., issued Feb. 22, 1994, and U.S. Pat. Nos. 4,639,489 and 4,749,740, Aizawa et al at column 1, line 46 through column 4, line 35.

The silicone suds suppressor herein preferably comprises polyethylene glycol and a copolymer of polyethylene glycol/polypropylene glycol, all having an average molecular weight of less than about 1,000, preferably between about 100 and 800. The polyethylene glycol and polyethylene/polypropylene glycol copolymers herein have a solubility in water at room temperature of more than about 2 weight %, preferably more than about 5 weight %.

The preferred solvent herein is polyethylene glycol having an average molecular weight of less than about 1,000, more preferably between about 100 and 800, most preferably between 200 and 400, and a copolymer of polyethylene glycol/polypropylene glycol, preferably PPG 200/PEG 300. Preferred is a weight ratio of between about 1:1 and 1:10, most preferably between 1:3 and 1:6, of polyethylene glycol:copolymer of polyethylene-polypropylene glycol.

Other suds suppressors useful herein comprise the secondary alcohols (e.g., 2-alkyl alkanols) and mixtures of such alcohols with silicone oils, such as the silicones disclosed in U.S. Pat. Nos. 4,798,679, 4,075,118 and EP 150,872. The secondary alcohols include the $C_6$–$C_{16}$ alkyl alcohols having a $C_1$–$C_{16}$ chain. A preferred alcohol is 2-butyl octanol, which is available from Condea under the trademark ISOFOL 12. Mixtures of secondary alcohols are available under the trademark ISALCHEM 123 from Enichem. Mixed suds suppressors typically comprise mixtures of alcohol+silicone at a weight ratio of 1:5 to 5:1.

For any detergent compositions to be used in automatic laundry washing machines, suds should not form to the extent that they overflow the washing machine. Suds suppressors, when utilized, are preferably present in a "suds suppressing amount". By "suds suppressing amount" is meant that the formulator of the composition can select an amount of this suds controlling agent that will sufficiently control the suds to result in a low-sudsing laundry detergent for use in automatic laundry washing machines.

The compositions herein will generally comprise from 0% to about 5% of suds suppressor. When utilized as suds suppressors, monocarboxylic fatty acids, and salts therein, will be present typically in amounts up to about 5%, by weight, of the detergent composition. Preferably, from about 0.5% to about 3% of fatty monocarboxylate suds suppressor is utilized. Silicone suds suppressors are typically utilized in amounts up to about 2.0%, by weight, of the detergent composition, although higher amounts may be used. This upper limit is practical in nature, due primarily to concern with keeping costs minimized and effectiveness of lower amounts for effectively controlling sudsing. Preferably from about 0.01% to about 1% of silicone suds suppressor is used, more preferably from about 0.25% to about 0.5%. As used herein, these weight percentage values include any silica that may be utilized in combination with polyorganosiloxane, as well as any adjunct materials that may be utilized. Monostearyl phosphate suds suppressors are generally utilized in amounts ranging from about 0.1% to about 2%, by weight, of the composition. Hydrocarbon suds suppressors are typically utilized in amounts ranging from about 0.01% to about 5.0%, although higher levels can be used. The alcohol suds suppressors are typically used at 0.2%–3% by weight of the finished compositions.

Brightener—Any conventional optical brighteners or other brightening or whitening agents known in the art can be incorporated at levels typically from about 0.05% to about 1.2%, by weight, into the detergent compositions herein. Commercial optical brighteners which may be useful in the present invention can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982).

Specific examples of optical brighteners which are useful in the present compositions are those identified in U.S. Pat. No. 4,790,856, issued to Wixon on Dec. 13, 1988. These brighteners include the PHORWHITE series of brighteners from Verona. Other brighteners disclosed in this reference include: Tinopal UNPA, Tinopal CBS and Tinopal 5BM; available from Ciba-Geigy; Artic White CC and Artic White CWD, available from Hilton-Davis, located in Italy; the 2-(4-stryl-phenyl)-2H-napthol[1,2-d]triazoles; 4,4'-bis-(1,2, 3-triazol-2-yl)-stil-benes; 4,4'-bis(stryl)bisphenyls; and the aminocoumarins. Specific examples of these brighteners include 4-methyl-7-diethyl-amino coumarin; 1,2-bis (venzimidazol-2-yl)ethylene; 1,3-diphenyl-phrazolines; 2,5-bis(benzoxazol-2-yl)thiophene; 2-stryl-napth-[1,2-d] oxazole; and 2-(stilbene-4-yl)-2H-naphtho-[1,2-d]triazole. See also U.S. Pat. No. 3,646,015, issued Feb. 29, 1972 to Hamilton. Anionic brighteners are preferred herein.

Fabric Softeners—Various through-the-wash fabric softeners, especially the impalpable smectite clays of U.S. Pat. No. 4,062,647, Storm and Nirschl, issued Dec. 13, 1977, as well as other softener clays known in the art, can optionally be used typically at levels of from about 0.5% to about 10% by weight in the present compositions to provide fabric softener benefits concurrently with fabric cleaning. Clay softeners can be used in combination with amine and cationic softeners as disclosed, for example, in U.S. Pat. No. 4,375,416, Crisp et al, Mar. 1, 1983 and U.S. Pat. No. 4,291,071, Harris et al, issued Sep. 22, 1981.

Other Ingredients—A wide variety of other ingredients useful in detergent compositions can be included in the compositions herein, including other active ingredients, carriers, hydrotropes, processing aids, dyes or pigments, solvents for liquid formulations, solid fillers for bar compositions, etc. If high sudsing is desired, suds boosters such as the $C_{10}$–$C_{16}$ alkanolamides can be incorporated into the compositions, typically at 1%–10% levels. The $C_{10}$–$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, soluble magnesium salts such as $MgCl_2$, $MgSO_4$, and the like, can be added at levels of, typically, 0.1%–2%, to provide additional suds and to enhance grease removal performance.

Various detersive ingredients employed in the present compositions optionally can be further stabilized by absorbing said ingredients onto a porous hydrophobic substrate, then coating said substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

To illustrate this technique in more detail, a porous hydrophobic silica (trademark SIPERNAT D10, DeGussa) is admixed with a proteolytic enzyme solution containing 3%–5% of $C_{13-15}$ ethoxylated alcohol (EO 7) nonionic surfactant. Typically, the enzyme/surfactant solution is 2.5× the weight of silica. The resulting powder is dispersed with stirring in silicone oil (various silicone oil viscosity in the range of 500–12,500 can be used). The resulting silicone oil dispersion is emulsified or otherwise added to the final detergent matrix. By this means, ingredients such as the aforementioned enzymes, bleaches, bleach activators, bleach catalysts, photoactivators, dyes, fluorescers, fabric conditioners and hydrolyzable surfactants can be "protected" for use in detergents, including liquid laundry detergent compositions.

Liquid detergent compositions can contain water and other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerin, and 1,2-propanediol) can also be used. The compositions may contain from 5% to 90%, typically 10% to 50% of such carriers.

The detergent compositions herein will preferably be formulated such that, during use in aqueous cleaning operations, the wash water will have a pH of between about 6.5 and about 11, preferably between about 7.5 and 10.5. Liquid dishwashing product formulations preferably have a pH between about 6.8 and about 9.0. Laundry products are typically at pH 9–11. Techniques for controlling pH at recommended usage levels include the use of buffers, alkalis, acids, etc., and are well known to those skilled in the art.

Dye Transfer Inhibiting Agents—The compositions of the present invention may also include one or more materials effective for inhibiting the transfer of dyes from one fabric to another during the cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% by weight of the composition, preferably from about 0.01% to about 5%, and more preferably from about 0.05% to about 2%.

More specifically, the polyamine N-oxide polymers preferred for use herein contain units having the following structural formula: R—$A_x$—P; wherein P is a polymerizable unit to which an N—O group can be attached or the N—O group can form part of the polymerizable unit or the N—O group can be attached to both units; A is one of the following structures: —NC(O)—, —C(O)O—, —S—, —O—, —N=; x is 0 or 1; and R is aliphatic, ethoxylated aliphatics, aromatics, heterocyclic or alicyclic groups or any combination thereof to which the nitrogen of the N—O group can be attached or the N—O group is part of these groups. Preferred polyamine N-oxides are those wherein R is a heterocyclic group such as pyridine, pyrrole, imidazole, pyrrolidine, piperidine and derivatives thereof.

The N—O group can be represented by the following general structures:

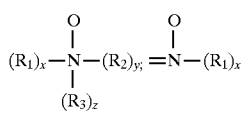

wherein $R_1$, $R_2$, $R_3$ are aliphatic, aromatic, heterocyclic or alicyclic groups or combinations thereof; x, y and z are 0 or 1; and the nitrogen of the N—O group can be attached or form part of any of the aforementioned groups. The amine oxide unit of the polyamine N-oxides has a pKa<10, preferably pKa<7, more preferred pKa<6.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof. These polymers include random or block copolymers where one monomer type is an amine N-oxide and the other monomer type is an N-oxide. The amine N-oxide polymers typically have a ratio of amine to the amine N-oxide of 10:1 to 1:1,000,000. However, the number of amine oxide groups present in the polyamine oxide polymer can be varied by appropriate copolymerization or by an appropriate degree of N-oxidation. The polyamine oxides can be obtained in almost any degree of polymerization. Typically, the average molecular weight is within the range of 500 to 1,000,000; more preferred 1,000 to 500,000; most preferred 5,000 to 100,000. This preferred class of materials can be referred to as "PVNO".

The most preferred polyamine N-oxide useful in the detergent compositions herein is poly(4-vinylpyridine-N-oxide) which as an average molecular weight of about 50,000 and an amine to amine N-oxide ratio of about 1:4.

Copolymers of N-vinylpyrrolidone and N-vinylimidazole polymers (referred to as a class as "PVPVI") are also preferred for use herein. Preferably the PVPVI has an average molecular weight range from 5,000 to 1,000,000, more preferably from 5,000 to 200,000, and most preferably from 10,000 to 20,000. (The average molecular weight range is determined by light scattering as described in Barth, et al., *Chemical Analysis*, Vol 113. "Modem Methods of Polymer Characterization", the disclosures of which are incorporated herein by reference.) The PVPVI copolymers typically have a molar ratio of N-vinylimidazole to N-vinylpyrrolidone from 1:1 to 0.2:1, more preferably from 0.8:1 to 0.3:1, most preferably from 0.6:1 to 0.4:1. These copolymers can be either linear or branched.

The present invention compositions also may employ a polyvinylpyrrolidone ("PVP") having an average molecular weight of from about 5,000 to about 400,000, preferably from about 5,000 to about 200,000, and more preferably from about 5,000 to about 50,000. PVP's are known to persons skilled in the detergent field; see, for example, EP-A-262,897 and EP-A-256,696, incorporated herein by reference. Compositions containing PVP can also contain polyethylene glycol ("PEG") having an average molecular weight from about 500 to about 100,000, preferably from about 1,000 to about 10,000. Preferably, the ratio of PEG to PVP on a ppm basis delivered in wash solutions is from about 2:1 to about 50:1, and more preferably from about 3:1 to about 10:1.

The following non-limiting examples illustrate the use of a composition of the present invention as a soil release agent comprising fluorescent whitening groups for the thru-the-wash application to polyester fabrics.

EXAMPLES 1 & 2

The following describe high density liquid detergent compositions according to the present invention:

|  | weight % | |
|---|---|---|
| Ingredients | 1 | 2 |
| Polyhydroxy Coco-Fatty Acid Amide | 3.65 | 3.50 |
| $C_{12}$-$C_{13}$ Alcohol Ethoxylate $E_9$ | 3.65 | 0.80 |
| Sodium $C_{12}$-$C_{15}$ Alcohol Sulfate | 6.03 | 2.50 |
| Sodium $C_{12}$-$C_{15}$ Alcohol Ethoxylate $E_{2.5}$ Sulfate | 9.29 | 15.10 |
| $C_{10}$ Amidopropyl Amine | 0 | 1.30 |
| Citric Acid | 2.44 | 3.0 |
| Fatty Acid ($C_{12}$-$C_{14}$) | 4.23 | 2.00 |
| Ethanol | 3.00 | 2.81 |
| Monoethanolamine | 1.50 | 0.75 |
| Propanediol | 8.00 | 7.50 |
| Boric Acid | 3.50 | 3.50 |
| Tetraethylenepentamine | 0 | 1.18 |
| Sodium Toluene Sulfonate | 2.50 | 2.25 |
| NaOH | 2.08 | 2.43 |
| Minors* | 1.60 | 1.30 |
| Soil Release Polymer | 0.33 | 0.22 |
| Soil Release Polymer/FWA** | 0.50 | 0.50 |
| Water | balance | balance |

*Minors - includes optical brightener and enzymes (protease, lipase, cellulase, and amylase).
**Soil release polymer according to Example 12.

Compositions of the present invention are also prepared by preparing high density granular formulas according to this example utilizing the fluorescent whitening soil release polymers alone or in combination with other soil release polymers.

EXAMPLES 3–6

|  | weight % | | | |
|---|---|---|---|---|
| Ingredient | 3 | 4 | 5 | 6 |
| Sodium $C_{11}$-$C_{13}$ alkylbenzenesulfonate | 13.3 | 13.7 | 10.4 | 11.1 |
| Sodium $C_{14}$-$C_{15}$ alcohol sulfate | 3.9 | 4. | 4.5 | 11.2 |
| Sodium $C_{14}$-$C_{15}$ alcohol ethoxylate | 2.0 | 2.0 | 0.0 | 0.0 |

-continued

| Ingredient | weight % | | | |
|---|---|---|---|---|
| | 3 | 4 | 5 | 6 |
| (0.5) sulfate | | | | |
| Sodium C$_{14}$–C$_{15}$ alcohol ethoxylate (6.5) | 0.5 | 0.5 | 0.5 | 1.0 |
| Tallow fatty acid | 0.0 | 0.0 | 0.0 | 1.1 |
| Sodium tripolyphosphate | 0.0 | 41.0 | 0.0 | 0.0 |
| Zeolite A, hydrate (0.1–10 micron size) | 26.3 | 0.0 | 21.3 | 28.0 |
| Sodium carbonate | 23.9 | 12.4 | 25.2 | 16.1 |
| Sodium Polyacrylate (45%) | 3.4 | 0.0 | 2.7 | 3.4 |
| Sodium silicate (1:6 ratio NaO/SiO$_2$) (46%) | 2.4 | 6.4 | 2.1 | 2.6 |
| Sodium sulfate | 10.5 | 10.9 | 8.2 | 15.0 |
| Sodium perborate | 1.0 | 1.0 | 5.0 | 0.0 |
| Poly(ethyleneglycol), MW ~ 4000 (50%) | 1.7 | 0.4 | 1.0 | 1.1 |
| Citric acid | 0.0 | 0.0 | 3.0 | 0.0 |
| Nonyl ester of sodium p-hydroxybenzene-sulfonate | 0.0 | 0.0 | 5.9 | 0.0 |
| Soil release polymer | 0.5 | 0.5 | 0.5 | 0.5 |
| Soil release polymer comprising fluorescent whitening unit according to Example 25 | 0.5 | 0.5 | 0.5 | 0.5 |
| Moisture | 7.5 | 3.1 | 6.1 | 7.3 |

Balance to 100% can, for example, include minors like optical brightener, perfume, suds suppresser, soil dispersant, protease, lipase, cellulase, chelating agents, dye transfer inhibiting agents, additional water, and fillers, including CaCO$_3$, talc, silicates, etc.

Aqueous crutcher mixes of heat and alkali stable components of the detergent compositions are prepared and spray-dried and the other ingredients are admixed so that they contain the ingredients tabulated at the levels shown. The soil release agents of the present invention can be, for example, pulverized and admixed in an amount sufficient for use at a level of 0.5% by weight in conjunction with the detergent compositions.

The detergent granules with fluorescent whitening unit soil release polymers are added (99.5 parts/0.5 parts by weight, respectively) together with a 6 lb. load of previously laundered fabrics (load composition: 10 wt % polyester fabrics/50 wt % polyester-cotton/40 wt % cotton fabrics) to a Sears KENMORE washing machine. Actual weights of detergent and soil release agent compositions are take to provide a 995 ppm concentration of the former and 5 ppm concentration of the latter in the 17 gallon (65 liter) water-fill machine. The water used has 7 grains/gallon hardness and a pH of 7 to 7.5 prior to (abut 9 to about 10.5 after) addition of the detergent and ester compositions.

The fabrics are laundered at 35° C. (95° F.) for a full cycle (12 min.) and rinsed at 21° C. (70° F.). the fabrics are then line dried and are exposed to a variety of soils (by wear or controlled application). The entire cycle of laundering and soiling is repeated several times for each of the detergent compositions. Separate fabric bundles are reserved for use with each of the detergent compositions. all polyester-containing fabrics display significantly improved whiteness during laundering compared with fabrics which have not been exposed to the compositions of the invention.

Soil release agents comprising fluorescent whitening units of the present invention are especially useful in conventional laundry detergent compositions such as those typically found in granular detergents or laundry bars. U.S. Pat. No. 3,178,370, Okenfuss, issued Apr. 13, 1965, describes laundry detergent bars and processes for making them. Philippine Patent 13,778, Anderson, issued Sep. 23, 1980, describes synthetic detergent laundry bars. Methods for making laundry detergent bars by various extrusion methods are well known in the art.

EXAMPLE 7

| Ingredients | Weight % |
|---|---|
| C$_{12}$ linear alkyl benzene sulfonate | 30 |
| Phosphate (as sodium tripolyphosphate) | 7 |
| Sodium carbonate | 25 |
| Sodium pyrophosphate | 7 |
| Coconut monoethanolamide | 2 |
| Zeolite A, (0.1–10 micron) | 5 |
| Carboxycellulose | 0.2 |
| Ethylenediamine disuccinate chelant (EDDS) | 0.4 |
| Polyacrylate (MW = 1400) | 0.2 |
| Nonanolyoxybenzenesulfonate | 5 |
| Soil release agent comprising fluorescent whitening unit* | 0.5 |
| Soil release agent | 0.5 |
| Sodium percarbonate** | 5 |
| Brightener, perfume | 0.2 |
| Protease | 0.3 |
| Calcium sulfate | 1 |
| Magnesium sulfate | 1 |
| Water | 4 |
| Filler*** | Balance to 100 |

*Soil release polymer according to Example 27.
**Average particle size of 400 to 1200 microns.
***Can be selected from convenient materials such as Calcium carbonate, talc, clay, silicates, and the like.

the detergent bars are processed in conventional soap or detergent bar making equipment as commonly used in the art. The soil release agent is pulverized and admixed in an amount sufficient for use at a level of 0.5% by weight in conjunction with the detergent compositions. Testing is conducted following the test methods in Examples 3–6.

Compositions of the present invention are also prepared by preparing bar formulas according to Examples 8 and 9.

EXAMPLES 8–9

Laundry bars suitable for hand-washing soiled fabrics are prepared by standard extrusion processes and comprise the following:

| Ingredients | weight % | |
|---|---|---|
| | 8 | 9 |
| LAS | 12 | 6 |
| Soap | 44 | 29 |
| Sodium tripolyphosphate | 5 | 5 |
| Sodium Carbonate | 4 | 6 |
| Optical brightener | 0.03 | 0 |
| Talc | 0 | 35.5 |
| Perfume | 0.45 | 0 |
| Sodium sulfate | 0.29 | 0 |
| Bentonite clay | 12.81 | 0 |
| Sodium chloride | 2 | 2 |
| Soil release agent | 0.5 | 0.5 |
| Soil release agent comprising fluorescent whitening units, according to Example 27 | 0.5 | |
| Soil release agent comprising fluorescent whitening units, according to Example 23 | | 0.5 |
| Other* | 0.42 | 1.5 |
| Water | balance | balance |

*Can be selected from convenient materials such as Calcium carbonate, talc, clay, silicates, and the like.

The following is an example of the preparation of a preferred soil release polymer comprising a fluorescent whitening unit.

EXAMPLE 10

Triphenylphosphonium-(4-carboxymethoxyphenyl) methane

To a 500 mL, three-necked round bottom flask equipped with a magnetic stirring bar, condenser, and thermometer connected to a temperature controlling device (Thermowatch, I²R) is added 4-chloromethylbenzoic acid (Aldrich, 66.7 gm, 0.391 mol), methanol (Baker, 272 gm, 8.5 mol), and Amberlyst® 15 acidic resin (12 gm, 55.2 meq). The solution is heated at reflux overnight. A $^1$H-NMR (DMSO-$d_6$) shows the virtual disappearance of the carboxylic acid peak at ~11.5 ppm and the emergence of a methyl ester peak at ~4 ppm. The solution is filtered and concentrated on the rotary evaporator and Kugelrohr apparatus (Aldrich, 80° C.) to afford 60.7 gm (0.329 mol) of thick white liquid. To this matcrial in a 1 L three-necked round bottom flask equipped as described above is added triphenylphosphine (TCI, 87.3 gm, 0.333 mol) and toluene (Baker, ~300 gm). The initially clear solution begins to form a white precipitate after a few minutes at reflux and is allowed to stir at reflux overnight. A $^{13}$C—NMR (DMSO-$d_6$) shows ~15% starting materials remaining. An additional 18 gm (0.069 mol) of triphenylphosphine is added, and the mixture is heated at reflux for an additional overnight period. A $^{13}$C—NMR (DMSO-$d_6$) shows the virtual disappearance of the peak at ~45 ppm for starting chloride (—CH2Cl) and the emergence of product peaks at ~28.5 ppm and ~29 ppm [—CH$_2$P(C$_6$H$_5$)$_3$]. The toluene is evaporated on the rotary evaporator and Kugelrohr apparatus (~100° C.) to afford 164 gm of white solid.

EXAMPLE 11

Synthesis of Trans-methyl 2'-Sodiosulfostilbene-4-carboxylate

To 146 gm (0.327 mol) of the adduct prepared in Example 10 in a 2L, three-neck round bottom flask equipped with a magnetic stirring bar, condenser, addition funnel, and thermometer connected to a temperature controlling device (Thermowatch, I²R), is added 2-formylbenzenesulfonic acid, sodium salt, hydrate (Aldrich, 80 gm, ~0.35 mol), and methanol (Baker, ~900 gm). The solution is heated to reflux under argon, and sodium methoxide (Aldrich, 80.8 gm of 25% solution in methanol, 0.374 mol) is added from the addition funnel over ~15 min. The solution is heated at reflux for 8 hrs. A $^{13}$C—NMR (DMSO-$d_6$) shows the disappearance of the peaks for starting material at ~28.5 ppm and 29 ppm [—CH$_2$P(C$_6$H$_5$)$_3$]. Most of the methanol is removed on the rotary evaporator (~60° C.). The remaining material is taken up in ~500 ml water, forming a milky suspension. The mixture is adjusted to pH 7 with a few drops of methanesulfonic acid (Aldrich). The mixture is cooled in an ice bath and filtered. A $^{13}$C—NMR (DMSO-$d_6$) shows the isolated solid to be mainly triphenylphosphine oxide. The mother liquor is concentrated to ~800 mL on the rotary evaporator and refrigerated overnight. The crystals which form arc filtered, dried, and stirred vigorously in hot 50:50 water:toluene. The water layer is concentrated to afford 20 gm of white powder. The combination of $^{13}$C—NMR, $^1$H—NMR, C.O.S.Y. and N.O.E. indicates that the material is a 60:40 mixture of trans:cis isomers of the substituted stilbene compound.

EXAMPLE 12

Preparation of an Oligomer of trans-methyl 2'-sodiosulfostilbene-4-carboxylate, dimethyl terephthalate, sodium 2-(2,3-dihydroxypropoxy) ethanesulfonate, glycerol, propylene glycol, and ethylene glycol To a 100 mL, three neck, round bottom flask equipped with a magnetic stirring bar, modified Claisen head, condenser (set for distillation), thermometer, and temperature controller (Therm-O-Watch®, I²R) is added trans-methyl 2'-sodiosulfostilbene-4-carboxylate (5.3 gm, 0.016 mol), dimethyl terephthalate (7.6 gm, 0.039 mol), sodium 2-(2,3-dihydroxypropoxy)ethanesulfonate (4.4 gm, 0.020 mol), glycerol (Baker, 0.21 gm, 0.0023 mol), ethylene glycol (Baker, 7.3 gm, 0.118 mol), propylene glycol (Baker, 9.1 gm, 0.120 mol), and titanium (IV) propoxide (0.01 gm, 0.02% of total reaction weight). This mixture is heated to 180° C. and maintained at that temperature overnight under argon as methanol distills from the reaction vessel. The material is transferred to a 250 mL, single neck, round bottom flask and heated gradually over about 10 minutes to 180° C. in a Kugelrohr apparatus (Aldrich) at about 50 mm Hg and maintained there for 30 minutes, after which the temperature is raised to 230° C. for 1 hr. The vacuum is then increased to about 5 mm Hg, and heating at 230° C. is continued for 4 hrs. The reaction flask is allowed to air cool quite rapidly to near room temperature under vacuum (~30 min.) The reaction affords 17.7 gm of the desired oligomer as a brown glass. A $^{13}$C—NMR(DMSO-$d_6$) shows a resonance for —C(O)OCH2CH2O(O)C— at ~63.2 ppm (diester) and a resonance for —C(O)OCH2CH2OH at ~59.4 ppm (monoester). The ratio of the peak for the diester resonance to that of the monoester resonance is measured to be 10. A resonance at ~51.5 ppm representing the sulfoethoxy group (—CH2SO3Na), and resonances at ~142 ppm and ~146 ppm representing the sulfonated capping group are also present. A $^1$H—NMR(DMSO-$d_6$) shows a resonance at ~7.9 ppm representing terephthalate aromatic hydrogens. Analysis by Hydrolysis-GC shows that the mole ratio of incorporated ethylene glycol to incorporated propylene glycol is 1.75:1

EXAMPLE 13

Preparation of triphenylphosphonium-biphenylmethane

To a 1000 mL, three-necked round bottom flask equipped with a magnetic stirring bar, condenser, and thermometer connected to a temperature controlling device (Thermowatch, I²R) is added 4-chloromethylbiphenyl (Aldrich, 41.7 gm, 0.391 mol), triphenylphosphine (TCI, 87.3 gm, 0.333 mol) and toluene (Baker, ~300 gm). The initially clear solution begins to form a white precipitate after a few minutes at reflux and is allowed to stir at reflux overnight. A $^{13}$C—NMR (DMSO-$d_6$) shows ~15% starting materials remaining. An additional 18 gm (0.069 mol) of triphenylphosphine is added, and the mixture is heated at reflux for an additional overnight period. A $^{13}$C—NMR (DMSO-$d_6$) shows the virtual disappearance of the peak at ~45 ppm for starting chloride (—CH2Cl) and the emergence of product peaks at ~28.5 ppm and ~29 ppm [—CH$_2$P(C$_6$H$_5$)$_3$]. The toluene is evaporated on the rotary evaporator and Kugelrohr apparatus (~100° C.) to afford approximately 97 gm of white solid.

EXAMPLE 14

Preparation of trans methyl 4'-phenylstilbene-4-carboxylate

To a 2 L three-neck round bottom flask equipped with a magnetic stirring bar, condenser, addition funnel and thermometer connected to a temperature controlling device (Thermowatch, I²R), is added sequentially with good stirring 4-carboxybenzaldehyde (Aldrich 52.5 gm, 0.35 mol), sodium methoxide (Aldrich 81 gm of 25% solution in methanol, 0.375 mol), 91 gm (0.327 mol) of the adduct prepared in Example 13 and methanol (Baker, ~900 gm). The solution is heated to reflux under argon, and sodium methoxide (Aldrich, 80.8 gm of 25% solution in methanol, 0.374 mol) is added from the addition funnel over ~15 min. The solution is heated at reflux for 8 hrs. A $^{13}$C—NMR (DMSO-d$_6$) shows the disappearance of the peaks for starting material at ~28.5 ppm and 29 ppm [—CH$_2$P(C$_6$H$_5$)$_3$]. Most of the methanol is removed on the rotary evaporator (~60° C.). The remaining material is taken up in ~500 mL methanol. The mixture is adjusted to pH 8–9 with a few drops of methanesulfonic acid (Aldrich). The mixture is cooled in an ice bath and filtered. A $^{13}$C—NMR (DMSO-d$_6$) shows the isolated solid to be mainly triphenylphosphine oxide. The mother liquor is concentrated to ~800 mL on the rotary evaporator, adjusted to pH of about 3 with methanesulfonic acid and refrigerated overnight. The solid which forms is broken up and filtered then dissolved in methanol (Baker, 272 gm, 8.5 mol) and Amberlyst® 15 acidic resin (12 gm, 55.2 meq). The solution is refluxed overnight. A $^1$H—NMR (DMSO-d$_6$) shows the virtual disappearance of the carboxylic acid peak at ~11.5 ppm and the emergence of a methyl ester peak at ~4 ppm. The solution is filtered and concentrated on the rotary evaporator and Kugelrohr apparatus (Aldrich, 80° C.) to afford 17.9 gm of thick paste. The combination of $^{13}$C—NMR, $^1$H—NMR, C.O.S.Y. and N.O.E. indicates that the material is a mixture of trans:cis isomers of the substituted stilbene compound.

EXAMPLE 15

Preparation of an Oligomer of trans methyl 4'-phenylstilbene-4-carboxylate, dimethyl terephthalate, sodium 2-(2,3-dihydroxypropoxy) ethanesulfonate, glycerol propylene glycol, and ethylene glycol To a 250 mL, three neck, round bottom flask equipped with a magnetic stirring bar, modified Claisen head, condenser (set for distillation), thermometer, and temperature controller (Therm-O-Watch™, I$^2$R) is added, trans methyl 4'-phenylstilbene-4-carboxylate (15.7 gm, 0.05 mole), sodium 2-(2-hydroxy-ethoxy)ethanesulfonate (9.2 gm, 0.048 mol) (prepared in accordance with U.S. Pat. No. 5,415,807, Gosselink, issued May 16, 1995), dimethyl terephthalate (Aldrich, 46.5 gm, 0.24 mole), dimethyl 5-sulfoisophthalate, sodium salt (Aldrich, 14.2 gm, 0.048 mole), ethylene glycol (Baker, 89.2 gm, 1.44 mol), propylene glycol (Baker, 109.4 g, 1.44 mol), hydrated monobutyltin oxide (M&T Chemicals, 0.47 gm, 2% of total reaction weight), sodium acetate (MCB, 0.89 gm, 2 mol % of dimethyl 5-sulfoisophthalate, sodium salt), and silicone oil (Dow-710 TM, 0.08 gm, 0.1% of final oligomer weight). This mixture is heated to 180° C. and maintained at that temperature overnight under argon as methanol and water distill from the reaction vessel. The material is transferred to a 1000 mL. single neck, round bottom flask and heated gradually over about 20 minutes to 240° C., in a Kugelrohr apparatus (Aldrich) at about 0.5 mm Hg and maintained there for 5 hours. The reaction is then allowed to air cool quite rapidly to near room temperature under vacuum (approximately 30 minutes). The reaction affords 52 gm of the desired oligomer as a opaque amber solid.

EXAMPLE 16

Preparation of 2-[3-(2,3-dihydroxypropoxy)phenyl]-3-methylbenzofuran

The ester which results from the condensation of 2'-hydroxyacetophenone and m-anisic acid is converted to 2-(3-methoxyphenyl)-3-methylbenzofuran by reductive cyclization in dioxane with a titanium tetrachloride/zinc metal catalyst according to the method of Banerji and Nayak, *J Chem. Soc., Chem. Comm.*, (1990), 150. The 2-(3-methoxyphenyl)-3-methylbenzofuran (47.6 gm, 0.198 mol) is treated with several volumes of pyridine hydrochloride at 200° C. for about 6 hours to cleave the methyl ether moiety to the free hydroxyl group. Three volumes of water are added to the cooled reaction mixture and the system is extracted twice with ether. The ether extracts are combined, washed once with water and then dried over sodium sulfate. Removal of solvent by rotary evaporation affords the desired product, 2-(3-hydroxyphenyl)-3-methylbenzofuran. 2-(3-hydroxyphenyl)-3-methyl-benzofuran (22.4 gm 0.1 mol) is dissolved in 100 mL of methanol in a 250 ml round bottom flask under an atmosphere of argon. To this well stirred solution is added sodium methoxide (0.54 gm, 0.01 mol). Glycidol (Aldrich, 8.14 gm, 0.11 mol) is added and the system is gradually heated and held at reflux for 18 hours. The solution is neutralized with methanesulfonic acid. The solvent is removed by rotary evaporation. The resulting product is heated on a Kugelrohr apparatus at 200° C. under a vacuum of 1 mm Hg, to remove any 3-methoxy-1,2-propanediol by-product, affording 2-[3-(2,3-dihydroxypropoxy)phenyl]-3-methylbenzofuran having the structure:

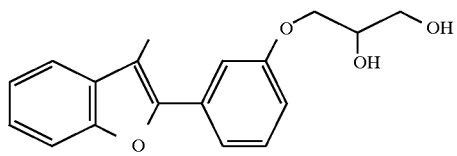

EXAMPLE 17

Preparation of ethoxylated 2-(3-hydroxvphenyl)-3-methylbenzofuran

To a 3-neck 1000 mL round bottom flask equipped with an overhead mechanical stirrer, Therm-O-Watch™ temperature controller, fritted glass inlet tube, condenser, ethylene oxide source, flow meter for ethylene oxide, acidic aqueous traps for scrubbing any excess ethylene oxide from the exit gas, and an argon supply inlet is charged 2-(3-hydroxyphenyl)-3-methylbenzofuran (22.4 gm, 0.1 mol) and 100 mL of dry dimethyl sufoxide. Sodium hydride (0.54 gm, 0.01 mol) added and the solution is gradually heated to 120° C. and held at that temperature until all of the sodium hydride has fully reacted. Ethylene oxide (Balchem) is bubbled into the reaction mixture below the level of the liquid until 2.5 moles have been added. The reaction mixture is cooled, neutralized by adding methanesulfonic acid, and solvent removed by evaporation on a Kugelrohr apparatus under a vacuum of 1 mm Hg at 180° C. IH and 1$^3$C NMR spectroscopy confirms the formation of ethoxylated 2-(3-hydroxyphenyl)-3-methylbenzofuran wherein the average degree of ethoxylation is 20 (n=20) and having the structure:

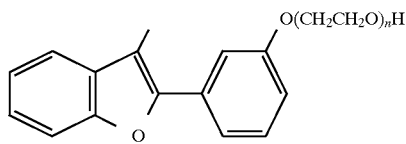

EXAMPLE 18

Preparation of sulfonated 2-(3-methoxvphenyl)-3-methylbenzonfuran

To a 3-neck 1000 mL round bottom flask equipped with an overhead mechanical stirrer, Therm-O-Watch™ temperature controller, fritted glass inlet tube, condenser, ethylene oxide source, flow meter for ethylene oxide, acidic aqueous traps for scrubbing any excess ethylene oxide from the exit gas, and an argon supply inlet is charged 2-(3-hydroxyphenyl)-3-methylbenzofuran (22.4 gm, 0.1 mol) and 100 mL of dry nitrobenzene. Sulfur trioxide-N,N-dimethylformamide (Aldrich, 23.0 gm, 0.15 mol) is added with sufficient stirring and the solution is gradually heated to 115° C. and held at that temperature for about 2 hours. The reaction mixture is cooled to 60° C. and the pH is adjusted to about 7 with 10% aqueous sodium hydroxide solution. The solvents are removed by evaporation on a Kugelrohr apparatus under a vacuum of 1 mm Hg at 200° C. to afford the desired sulfonated hydroxyphenyl benzofuran as a mixture of sulfonated adducts having the structure:

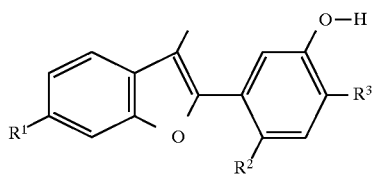

wherein at least one of the units $R^1$, $R^2$, or $R^3$ is the sulfonate group, —$SO_3Na$, and wherein the average number of sulfonate groups per molecule is about 1.5.

EXAMPLE 19

Preparation of sulfonated 2-[3-(2,3-dihydroxypropoxy)phenYl]-3-methylbenzonfuran The mixture of sulfonated benzofurans from Example 18 is dissolved in methanol and sodium methoxide (0.54 gm, 0.01 mol) is added with sufficient stirring. Glycidol (Aldrich, 8.14 gm, 0.11 mole) is added and the solution is refluxed for 18 hours. The solvent is removed by rotary evaporation and the 3-methoxy-1,2-propanediol by-product is removed by heating at 200° C. on a Kugelrohr apparatus under a vacuum of 1 mm Hg for 1 hour to afford 2-[3-(2,3-dihydroxypropoxy)phenyl]-3-methylbenzofuran having the structure:

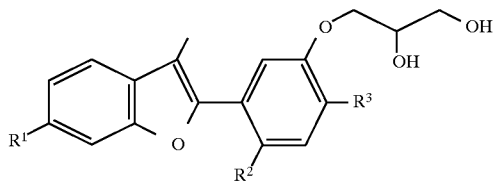

wherein at least one of the units $R^1$, $R^2$, or $R^3$ is the sulfonate group, —$SO_3Na$, and wherein the average number of sulfonate groups per molecule is about 1.5.

EXAMPLE 20

Preparation of sulfonated 2-[3-(polvethyleneoxy-$E_3$)phenl]-3-methylbenzonfuran To a 3-neck 1000 mL round bottom flask equipped with an overhead mechanical stirrer, Therm-O-Watch™ temperature controller, fritted glass inlet tube, condenser, ethylene oxide source, flow meter for ethylene oxide, acidic aqueous traps for scrubbing any excess ethylene oxide from the exit gas, and an argon supply inlet is charged the sulfonated hydroxyphenyl benzofuran from Example 18 (0.2 mole) and 100 mL of dry dimethyl sufoxide. Sodium hydride (0.54 gm, 0.01 mol) added and the solution is gradually heated to 120° C. and held at that temperature until all of the sodium hydride has fully reacted. Ethylene oxide (Balchem) is bubbled into the reaction mixture below the level of the liquid until 3.5 moles have been added. The reaction mixture is cooled, neutralized by adding methanesulfonic acid, and solvent removed by evaporation on a Kugelrohr apparatus under a vacuum of 1 mm Hg at 180° C. to afford benzofuran having the structure

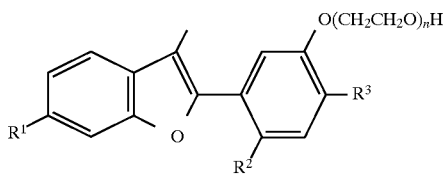

wherein the average degree of ethoxylation is 3 (n=3) and at least one of the units $R^1$, $R^2$, or $R^3$ is the sulfonate group, —$SO_3Na$, and wherein the average number of sulfonate groups per molecule is about 1.5.

EXAMPLE 21

Preparation of Sodium 2-[2-(2-Hydroxyethoxy)ethoxy]ethanesulfonate

To a 1000 mL, three neck, round bottom flask equipped with a magnetic stirring bar, modified Claisen head, condenser (set for distillation), thermometer, and temperature controller (Therm-O-Watch™, $I^2R$) is added isethionic acid, sodium salt (Aldrich, 100.0 gm, 0.675 mol) and distilled water (~90 mL). After dissolution, one drop of hydrogen peroxide (Aldrich, 30% by wt. in water) is added to oxidize traces of bisulfite. The solution is stirred for one hour. A peroxide indicator strip shows a very weak positive test. Sodium hydroxide pellets (MCB, 2.5 gm, 0.0625 mol) are added, followed by diethylene glycol (Fisher, 303.3 gm, 2.86 mol). The solution is heated at 190° C. under argon overnight as water distills from the reaction mixture. A $^{13}C$—NMR(DMSO-$d_6$) shows that the reaction is complete by the disappearance of the isethionate peaks at ~53.5 ppm and ~57.4 ppm. The solution is cooled to room temperature and neutralized to pH 7 with 57.4 g of a 16.4% solution of p-toluene-sulfonic acid monohydrate in diethylene glycol. (Alternatively, methanesulfonic acid may be used.) The $^{13}C$—NMR spectrum of the product shows resonances at ~51 ppm (—$CH_2SO_3Na$), ~60 ppm (—$CH_2OH$), and at ~69 ppm, ~72 ppm, and ~77 ppm for the remaining four methylenes. Small resonances are also visible for the sodium p-toluenesulfonate which formed during neutralization. The reaction affords 451 gm of a 35.3% solution of sodium 2-[2-(2-hydroxyethoxy)ethoxy]ethanesulfonate in diethylene glycol. The excess diethylene glycol is removed by adding 0.8 mol % of monobasic potassium phosphate (Aldrich) as a buffer and heating on a Kugelrohr apparatus (Aldrich) at 150° C. for ~3 hr. at ~1 mm Hg to give an extremely viscous oil or glass.

EXAMPLE 22

Preparation of sodium 2-(2,3-Dihydroxypropoxy)ethanesulfonate

To a 500 mL, three neck, round bottom flask equipped with a magnetic stirring bar, modified Claisen head, condenser (set for distillation), thermometer, and temperature controller (Therm-O-Watch™, $I^2R$) was added isethionic acid, sodium salt (Aldrich, 50.0 gm, 0.338 mol), sodium hydroxide (2.7 g, 0.0675 mol), and glycerin (Baker, 310.9 gm, 3.38 mol). The solution was heated at 190° C. under argon overnight as water distilled from the reaction mixture. A $^{13}$C—NMR(DMSO-$d_6$) showed that the reaction was complete by the virtual disappearance of the isethionate peaks at ~53.5 ppm and ~57.4 ppm, and the emergence of product peaks at ~51.4 ppm (—$CH_2SO_3Na$) and ~67.5 ppm ($CH_2CH_2SO_3Na$). The solution was cooled to ~100° C. and neutralized to pH 7 with methanesulfonic acid (Aldrich). The desired, neat material was obtained by adding 0.8 mol % of potassium phosphate, monobasic and heating on a Kugelrohr apparatus (Aldrich) at 200° C. for ~3 hr. at ~1 mm Hg to afford 77 gm of yellow waxy solid.

EXAMPLE 23

Preparation of an Oligomer of sodium 2-(2-[2-hydroxyethoxyl ethoxy)ethane-sulfonate, dimethyl terephthalate, sulfonated 2-[3-(2,3-Dihydroxypropoxy)-phenyl -3-methylbenzofuran with average degree of sulfonation of ~1.5, ethylene glycol, and propylene glycol To a 250 mL, three neck, round bottom flask equipped with a magnetic stirring bar, modified Claisen head, condenser (set for distillation), thermometer, and temperature controller (Thern-O-Watch, I²R) is added sodium 2-(2-[2-hydroxy-ethoxy]ethoxy)ethanesulfonate(5.33 gm, 0.025 mol) prepared as in Example 22, dimethyl terephthalate (9.8 gm, 0.050 mol), sulfonated 2-[3-(2,3-dihydroxypropoxy)-phenyl]-3-methylbenzofuran with average degree of sulfonation of ~1.5 ( 5.86 gm, 0.013 mol, as prepared in Example 19), glycerin (Baker, 1.2 gm, 0.013 mol) ethylene glycol (Baker, 11.7 gm, 0.189 mol), propylene glycol (Baker, 14.7 gm, 0.193 mol), and titanium(IV) propoxide (Aldrich, 0.01 gm, 0.02% of total reaction weight). This mixture is heated to 180° C. and maintained at that temperature overnight under argon as methanol distills from the reaction vessel. The material is transferred to a 250 mL, single neck, round bottom flask and gradually heated over about 20 minutes to 240° C. in a Kugelrohr apparatus (Aldrich) at 0.5 mm Hg for 1.5 hours. The reaction flask is then allowed to air cool quite rapidly to near room temperature under vacuum (~30 min.) The reaction affords about 20 gm of the desired oligomer as a brown glass. A $^{13}$C—NMR (DMSO-$d_6$) shows a resonance for —C(O)OCH$_2$CH$_2$O(O)C— at ~63.2 ppm (diester). A resonance for —C(O)OCH$_2$CH$_2$OH at ~59.4 ppm (monoester) is at least 8 times smaller than the diester peak.

EXAMPLE 24

Preparation of an oligomer comprising ethoxylated 2-(3-hydroxyphenyl)-3-methylbenzofuran having an average degree of ethoxylation of 20, dimethyl terephthalate, polyethylene glycol (MW=1500) and 1,2-propanediol.

To a 250 mL, three necked, round bottom flask fitted with a magnetic stirrer, internal thermometer, argon inlet, and modified Claisen head attached to a condenser and receiving flask, is charged ethoxylated 2-(3-hydroxyphenyl)-3-methylbenzofuran with an average degree of ethoxylation of 20 (14.4 gm, 0.013 moles), prepared as in Example 20, dimethyl terephthalate (20.9 gm, 0.107 moles), polyethylene glycol (MW=1500), (48.6 gm, 0.032 moles), 1,2-propanediol (propylene glycol), (10.3 gm, 0.136 moles), hydrated monobutyltin oxide catalyst 0.2 gm. The reaction mixture is gradually raised to 175° C. and held there overnight. Then the temperature was raised to 185° C. for 4 hours and then to 200° C. for about 24 hr during which time about 6.4 gm of distillate is collected. The reaction mixture is then transferred to a single neck, round bottom flask and placed on a Kugelrohr apparatus (Aldrich) at a vacuum of about 1 mm Hg and the temperature was gradually raised to 220° C. and held there for 2 hours to give the desired polyester. $^{13}$C NMR (CDCl$_3$) shows a single peak in the 10–20 ppm region at 16.6 for the methyl of propylene glycol diesters and the near absence of a peak at 60.7 ppm for free —(OCH$_2$CH$_2$)$_n$OH end group confirming that the polyesterification had proceeded to a high degree of completion.

EXAMPLE 25

Preparation of an oligomer of 2-[2-(2-hydroxyethoxy)ethoxy]ethanesulfonate, dimethyl terephthalate, sodium 2-(2,3-dihydroxypropoxy) ethanesulfonate, 2-[3-(2,3-dihydroxypropoxy) phenyl]3-methylbenzofuran, ethylene glycol, and propylene glycol.

To a 250 mL three neck, round bottom flask equipped with a magnetic stirring bar, modified Claisen head, condenser (set for distillation), thermometer, and temperature controller (Therm-O-Watch™, I²R) is added Sodium 2-[2-(2-hydroxyethoxy)ethoxy]ethanesulfonate (7.0 gm, 0.030 mol), dimethyl terephthalate (14.4 gm, 0.074 mol), sodium 2-(2,3-dihydroxypropoxy)ethanesulfonate (6.6 gm, 0.030 mol), 2-[3-(2,3-dihydroxypropoxy)phenyl]-3-methylbenzofuran (2.23 gm, 0.0075 mol, prepared as in Example 19) ethylene glycol (Baker, 14.0 gm, 0.225 mol), propylene glycol (Fisher, 18.3 gm, 0.240 mol), and titanium (IV) propoxide (0.01 gm, 0.02% of total reaction weight). This mixture is heated to 180° C. and maintained at that temperature overnight under argon as methanol distills from the reaction vessel. The material is transferred to a 500 mL, single neck, round bottom flask and heated gradually over about 20 minutes to 240° C. in a Kugelrohr apparatus (Aldrich) at about 0.1 mm Hg and maintained there for 110 minutes. The reaction flask is then allowed to air cool quite rapidly to near room temperature under vacuum (~30 min.) The reaction affords 26.4 gm of the desired oligomer as a brown glass. A $^{13}$C—NMR(DMSO-$d_6$) shows a resonance for—C(O)OCH$_2$CH$_2$O(O)C— at ~63.2 ppm (diester) and a resonance for—C(O)OCH$_2$CH$_2$OH at ~59.4 ppm (monoester). The ratio of the diester peak to monoester peak is measured to be 8. Analysis by exhaustive basic hydrolysis followed by gas chromatography of the volatile components shows that the mole ratio of incorporated ethylene glycol to incorporated propylene glycol is about 1.6:1.

EXAMPLE 26

Preparation of an oligomer comprising sulfonated, ethoxylated 2-(3-hydroxyphenyl)-3-methylbenzofuran with degree of ethoxylation of about 3 and average degree of sulfonation of about 1.5, dimethyl terephthalate, sulfonated 2-[3-(2,3-dihydroxypropoxv)phenyl]-3-methylbenzofuran with average degree of sulfonation of ~1.5, ethylene glycol, and propylene glycol with hydrotropes included.

To a 250 mL three neck, round bottom flask equipped with a magnetic stirring bar, modified Claisen head, condenser (set for distillation), thermometer, and temperature controller (Therm-O-Watch™, I²R) is added sulfonated, ethoxylated 2-(3-hydroxyphenyl)-3-methylbenzofuran with degree of ethoxylation of about 3 and average degree of sulfonation of about 1.5 (26.5 gm, 0.052 mol, prepared as in Example 20), dimethyl terephthalate (Aldrich, 55.5 gm, 0.286 mol), sulfonated 2-3-(2,3-dihydroxypropoxy)phenyl]-3-methylbenzofuran with average degree of sulfonation of ~1.5( 23.5 gm, 0.052 mol, prepared as in Example 19), ethylene glycol (Baker, 24.2 gm, 0.390 mol), propylene glycol (Baker, 28.7 gm, 0.377 mol), hydrated monobutyltin oxide (M&T Chemicals, 0.17 gm, ), sodium cumene-sulfonate (Ruetgers-Nease, 4g, ~4% of final polymer wt.), sodium xylenesulfonate (Ruetgers-Nease, 4g, ~4% of final polymer wt.), and sodium p-toluenesulfonate (Ruetgers-Nease, 4g, 4% of final polymer wt.). This mixture is heated to 180° C. and maintained at that temperature overnight under argon as methanol distills from the reaction vessel. The material is transferred to a 1000 mL, single neck, round bottom flask and heated gradually over about 20 minutes to 240° C. in a Kugelrohr apparatus (Aldrich) at about 2 mm Hg and maintained there for 3 hours. The reaction flask is then allowed to air cool quite rapidly to near room temperature under vacuum (~30 min.) The reaction affords ~110 gm of the desired oligomer as a crunchy glass. A $^{13}C$—NMR (DMSO-$d_6$) shows a resonance for—C(O)OCH$_2$CH$_2$O(O)C— at ~63.2 ppm (diester). A resonance for—C(O)OCH$_2$CH$_2$OH at ~59.4 ppm (monoester) is at least 10 times smaller than the diester peak. By exhaustive base hydrolysis and gas chromatography of the volatile products, the ratio of incorporated ethylene glycol: propylene glycol is found to be about 1.7.

EXAMPLE 27

Preparation of the fluorescent whitening group-containing soil release agent having the formula:

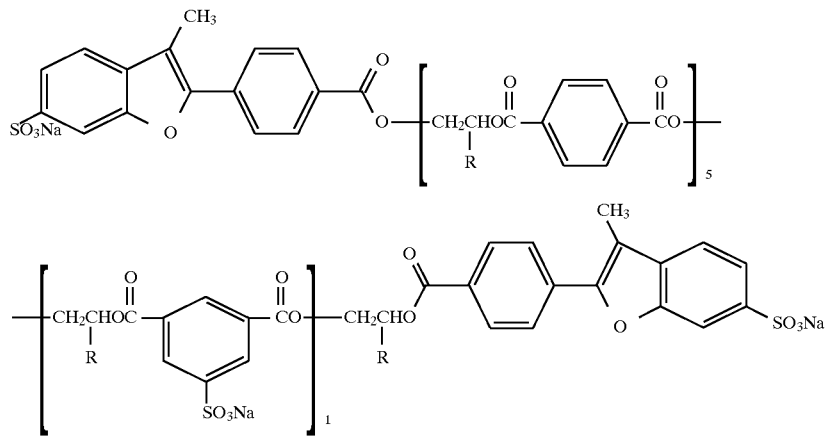

The methyl ester of 4-(chloromethyl)benzoic acid (Aldrich Chemical Co.) is prepared by heating at reflux the acid dissolved in a large excess of methanol in the presence of a catalytic amount of macroreticular ion exchange resin in the sulfonic acid form. The resin catalyst is removed by filtration and the solvent is removed in vacuo to afford the methyl ester.

2'-hydroxyacetophenone (13.6 g, 0.1 mol, Aldrich Chemical Co.) is dissolved in 100 g of dry DMF and treated with sodium hydride (2.6 g, 0.11 ) to make a solution of the nonosodium salt. To this phenoxide-containing solution is added the methyl 4-(chloromethyl)benzoate (18.5 g, 0.1 mol) and the reaction mixture is heated with stirring to 60° C. for 4 hours to yield the intermediate having the formula:

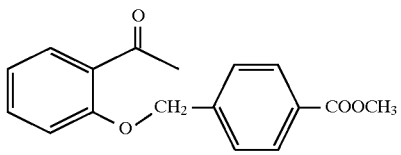

The solution is cooled to room temperature and sodium t-butoxide (1 g, 0.01 mol) is added and with continued stirring the temperature is raised gradually to about 80° C. and held there for 6 hours to generate the benzofuran intermediate having the formula:

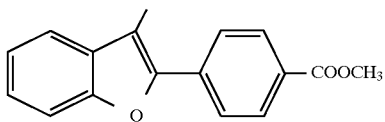

The benzofuran intermediate is isolated by filtering to remove salts and then removing the solvent in vacuo. The benzofuran is taken up in 200 ml of nitrobenzene and treated with sulfur trioxide-DMF complex (17 g, 0.11 mol) followed by heating the reaction mixture to 115° C. for about 2 hours. The reaction mixture is cooled to room temperature and neutralized by adding 0.11 moles of sodium methoxide in methanol. The solvents are removed in vacuo to yield a sulfonated benzofuran ester having the formula:

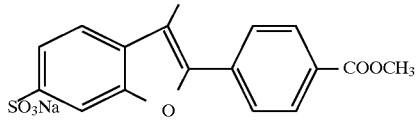

This sulfonated benzofuran ester intermediate is used directly as a capping monomer in synthesis of an oligomer as follows.

To a 100 mL, three-neck, round bottom flask equipped with a magnetic stirring bar, modified Claisen head, condenser set for distillation, thermometer, and temperature controller (THERM-O-WATCH, I²R®) are added the following monomers: the sulfonated benzofuran ester synthesized above (7.36 g, 0.02 mol), dimethyl terephthalate (9.7 g, 0.05 mol.), ethylene glycol (12.4 g, 0.2 mol), propylene glycol (15.2 g, 0.2 mol), and dimethyl 5-sodiosulfoisophthate (2.96 g, 0.01 mol). Tetrapropyl titanate (0.1 g) is added as a catalyst. The resulting mixture is heated to 180° C. with stirring overnight under argon while methanol, water and traces of glycols distill out. The contents of the 100 ml, three-neck, round-bottom flask is transferred to a 500 ml round-bottom flask and heated gradually (over ca. 20 min.) to 230° C. in a Kugelrohr apparatus (Aldrich) with reduced pressure of ca. 1 mm Hg for ca. 3 hr. The flask with its contents still under vacuum, is allowed to cool quite rapidly to room temperature by exposing the outer surface of the flask to convection or forced air flow (ambient air). The cooling takes about 20 min. The desired, fluorescent-capped, oligomeric material is obtained as a glassy solid weighing about 20 g. $^{13}$C NMR spectrum (DMSO-$d_6$) indicates polymerization has occurred by the near absence of a resonance at approximately 59 ppm, corresponding to the condensed monoesters of ethylene glycol and the presence of a substantial resonance at approximately 63 ppm representing diesters of ethylene glycol.

What is claimed is:

1. An oligomeric or polymeric substituted or unsubstituted ethylene terephthalate ester comprising fluorescent whitening groups, said compound having the formula:

[(Cap)(R⁴)$_t$][(A—R¹—A—R²)$_u$(A—R¹—A—R³)$_v$(A—R¹—A—R⁵)$_w$—A—R¹—A—][R⁴)$_t$(Cap)]

wherein the A moieties are selected from the group consisting of

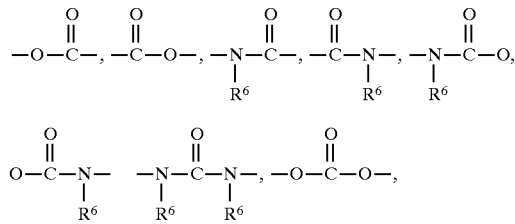

and combinations thereof, wherein R⁶ is hydrogen, $C_1$–$C_4$ alkyl, and mixtures thereof; the R¹ moieties are 1,2-phenylene, 1,3-phenylene and 1,4-phenylene, substituted 1,2-phenylene, 1,3-phenylene, and 1,4-phenylene having the formula

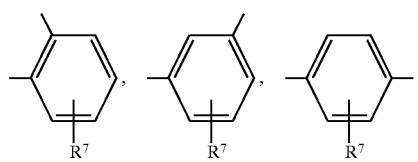

wherein R⁷ is —OH, —CO₂H, —SO₃⁻M⁺, branching units of the formula —(A—R¹—A—R²)$_u$(Cap), —(A—R¹—A—R²)$_u$A(Cap), —(A—R¹—A—R³)$_v$(Cap), —(A—R¹—A—R³)$_v$A(Cap), —(A—R¹—A—R⁵)$_w$(Cap), and —(A—R¹—A—R⁵)$_w$A(Cap), crosslinking units of the formula —(A—R¹—A—R²)$_u$—, —(A—R¹—A—R²)$_u$A—, —(A—R¹—A—R³)$_v$—, —(A—R¹—A—R³)$_v$A—, —(A—R¹—A—R⁵)$_w$—, and —(A—R¹—A—R⁵)$_w$A— connecting said R¹ moiety to an R¹ or R⁵ moiety of a second oligomer or polymer chain; substituted and unsubstituted naphthalene, arylalkylene units having the formula

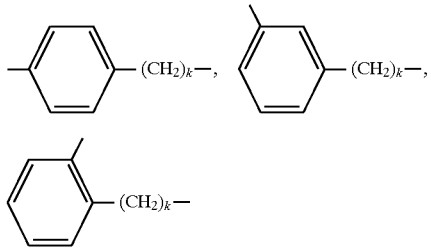

alkylene units having the formula

—(CH₂)$_k$— alkenylene units having the formula

—(CH=CH)$_j$—(CH₂)k— and combinations thereof, wherein k is 1 to 12, j is 1 or 2, and M is a cationic moiety; the R² moieties comprise substituted or unsubstituted ethyleneoxy units having the formula —(CH(Y)CH₂O)—  or  —(CH₂CH(Y)O)— wherein (a) Y is a —H, $C_1$–$C_4$ alkyl, alkoxymethyl, and mixtures thereof; and (b) combinations of the foregoing R² moieties with up to 50% of other compatible R² moieties wherein Y is a branching unit of the formula —CH₂O—(CH₂CH₂O)$_p$—CH₂CH₂—OR, wherein R is $C_1$–$C_4$ alkyl or a crosslinking unit of the formula —CH₂O—(CH₂CH₂O)$_R$—CH₂— by which said R² moiety is crosslinked to an R² moiety of a second oligomer or polymer chain; p is 0 to 50; the R³ ethyleneoxy units are selected from the moieties —(CH₂CH₂O)$_q$—CH₂CH₂— wherein q is from 1 to 99 wherein each R³ unit may have the same or different values of q; the R⁴ units are R², R³ or R⁵ units; the R⁵ units having the formula

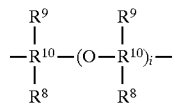

wherein the index i has the value of 0 or 1, R¹⁰ is $C_2$–$C_6$ linear alkylene, $C_3$–$C_6$ branched alkylene, $C_5$–$C_7$ cyclic alkylene, $C_5$–$C_7$ substituted cyclic alkylene, $C_5$–$C_7$ heterocyclic alkylene, arylene, substituted arylene, and mixtures thereof; said R¹⁰ unit is substituted by one or more R⁸, R⁹ unit, and mixtures thereof, wherein each R⁸ is independently selected from the group consisting of hydrogen, R⁷, and mixtures thereof; R⁹ moieties wherein each R⁹ is independently hydrogen, —Z—SO₃⁻M⁺, —Z—(FWU), and mixtures thereof, wherein each Z is a connecting moiety independently selected from the group consisting of alkylene, alkenylene, alkoxyalkylene, alkoxy, arylene, alkylarylene, alkoxyarylene, polyalkoxyalkylene units, and mixtures thereof; —(FWU) is a fluorescent whitening unit, wherein R⁸ and R⁹ when taken together, at least one R⁸ or R⁹ moiety is not a hydrogen atom; M is a cationic moiety; the value of t is 0 or 1; the value of u is from about 0 to about 60; the value of v is from about 0 to about 35; the value of w is from 0 to 35; the value of u+v+w=at least 3; comprising end-capping groups (Cap) independently selected from the group consisting of:

(a) fluorescent whitening units, said fluorescent whitening units are independently selected from the oroup consisting of substituted and unsubstituted stilbenes, coumarins, pyrazoles, naphthalimides, oxadizoles, aryltriazoles, distyrylbiphenyls, dibenzofuranyl biphenyls, benzofurans, and mixtures thereof; and (b) non-(fluorescent whitening) units, said non-(fluorescent whitening) units are selected from the group consisting of
  i) ethoxylated or propoxylated hydroxyethane and propanesulfonate units of the formula $(MO_3S)(CH_2)_m(R^{11}O)_nR^{11}$—, where M is a salt forming cation such as sodium or tetralkylammonium, $R^{11}$ is ethylene or propylene or a mixture thereof, m is 0 or 1, and n is from 0 to 20;
  ii) sulfoaroyl units of the formula —O(O)C($C_6H_4$)($SO_3^-M^+$), wherein M is a salt forming cation;
  iii) modified poly(oxyethylene)oxy monoalkyl ether units of the formula $R^{12}O(CH_2CH_2O)_kCH_2CH_2$—, wherein $R^{12}$ contains from 1 to 4 carbon atoms and k is from about 3 to about 100; and
  iv) ethoxylated or propoxylated phenolsulfonate end-capping units of the formula $MO_3S(C_6H_4)(OR^{13})_n$—, wherein n is from 1 to 20; M is a salt-forming cation; and $R^{13}$ is ethylene, propylene and mixtures thereof.

2. The compound according to claim 1 wherein each A is

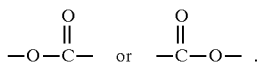

3. The compound according to claim 2 wherein the $R^1$ moieties having the formula

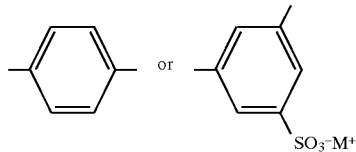

wherein M is a salt forming cation.

4. The compound according to claim 3 wherein the $R^5$ moieties comprise connecting Z moieties having the formula $-(CH_2)_n-$, $-CH_2(OCH_2CH_2)_n-$, $-OCH_2(C_6H_4)-$, $-O(C_6H_4)-$, and mixtures thereof; n is from 1 to 20.

5. The compound according to claim 4 wherein the end-capping group (Cap) comprises a fluorescent whitening unit having the formula

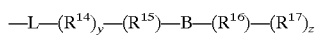

wherein the $R^{14}$ units are 1,4-phenylene or substituted 1,4-phenylene of the formula

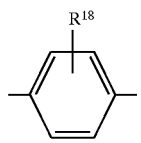

triazinylamino or substituted triazinylamino units of the formula

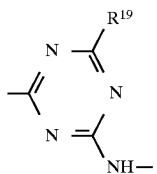

wherein $R^{18}$ and $R^{19}$ are independently selected from the group consisting of hydrogen, hydroxyl, amino, cyano, halogen, $-SO_3^-M^+$, $C_1-C_4$ alkylamino, $C_1-C_4$ dialkylamino and mixtures thereof; y is 0 or 1; $R^{15}$ and $R^{16}$ are each independently 1,4 phenylene or substituted 1,4-phenylene of the formula

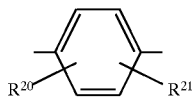

respectively wherein $R^{20}$ and $R^{21}$ are each independently selected from the group onsisting of hydrogen, amino, $C_1-C_4$ alkylamino, $C_1-C_4$ dialkylamino, $C_1-C_4$ alkoxy, anilino, N-methyl-N-hydroxyethylamino, bis(hydroxyethyl)amino, morpholino, diethylamino, chloro, bromo, iodo, cyano, nitrilo, sulfophenylamino, 2,5-disulfophenylamino, $-(SO_3^-M^+)$, $-CO_2H$, and mixtures thereof; $R^{17}$ units are member selected from the group consisting of hydrogen, hydroxyl, amino, methylamino, dimethylamino, cyano, $-SO_3^-M^+$, $C_1-C_4$ alkyl, $C_1-C_4$ alkoxy, phenyl, substituted phenyl of the formula

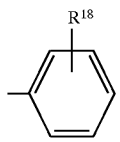

wherein $R^{18}$ is selected from the group consisting of hydrogen, hydroxyl, amino, cyano, halogen, $-SO_3^-M^+$, $C_1-C_4$ alkylamino, $C_1-C_4$ dialkylamino and mixtures thereof; triazinylamino, substituted triazinylamino of the formula

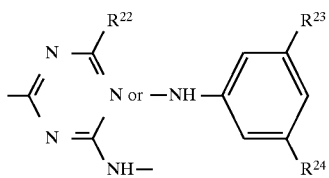

wherein $R^{22}$, $R^{23}$ and $R^{24}$ are independently selected from the group consisting of hydrogen, hydroxyl, amino, cyano, halogen, $-SO_3^-M^+$, $C_1-C_4$ alkylamino, $C_1-C_4$ dialkylamino and mixtures thereof; z is 0 or 1; M is a water soluble cation; B is a conjugated bridging moiety selected from the group consisting of ethylene, 4,4'-bisphenylethylene, 1,4-bisethylenephenylene, 1,4-naphthalene, and mixtures thereof; and L is a linking unit selected from the group consisting of A units, $R^2$ units, $R^3$ units, $R^5$ units, oxygen, $C_1-C_4$ alkyleneoxy, alkyleneamino, oxyalkylamino, aminoalkylamino, oxyalkoxy, oxypolyalkyleneoxy, and mixtures thereof.

6. A compound according to claim 5 wherein the conjugated bridging moiety B is ethylene or 4,4'-bisphenylethylene.

7. A compound according to claim 6 wherein $R^{15}$ and $R^{16}$ are 1,4-phenylene.

8. A compound according to claim 8 wherein $R^{17}$ is —$SO_3^-M^+$ and M is sodium or potassium.

9. A compound according to claim 8 wherein y is equal to 0.

10. A compound according to claim 9 wherein the linking L unit is an A moiety.

11. A compound according to claim 2 wherein the (Cap) units comprise non-fluorescent whitening units and $R^5$ units comprise pendant $R^9$ units of the formula —Z—(FWU), said —(FWU) units are selected from the group consisting of substituted and unsubstituted stilbenes, coumarins, pyrazoles, naphthalimides, oxadizoles, aryltriazoles, distyrylbiphenyls, dibenzofuranyl biphenyls, and mixtures thereof.

12. A laundry detergent composition comprising:

a) at least 0.01% by weight, of a detersive surfactant;

b) at least 0.01% by weight, a soil release polymer according to claim 1; and c) the balance carrier and adjunct ingredients.

13. A composition according to claim 12 wherein the adjunct ingredients are selected from the group consisting of builders, optical brighteners, bleaches, bleach boosters, bleach activators, soil release polymers, dye transfer agents, dispersents, enzymes, enzyme activators, suds suppressors, dyes, perfumes, colorants, filler salts, hydrotropes, and mixtures thereof.

* * * * *